(12) United States Patent
Ishii et al.

(10) Patent No.: US 12,393,910 B2
(45) Date of Patent: Aug. 19, 2025

(54) INFORMATION MANAGEMENT SYSTEM AND INFORMATION MANAGEMENT METHOD

(71) Applicant: TOYOTA JIDOSHA KABUSHIKI KAISHA, Toyota (JP)

(72) Inventors: Masahiko Ishii, Okazaki (JP); Hidetaka Asano, Nissin (JP); Keiichi Koga, Narashino (JP); Ryota Suzuki, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 18/356,402

(22) Filed: Jul. 21, 2023

(65) Prior Publication Data

US 2024/0037499 A1 Feb. 1, 2024

(30) Foreign Application Priority Data

Aug. 1, 2022 (JP) .................................. 2022-122487

(51) Int. Cl.
*G06Q 10/087* (2023.01)
(52) U.S. Cl.
CPC .................................. *G06Q 10/087* (2013.01)
(58) Field of Classification Search
CPC .... G06Q 10/087; G06Q 10/103; G06Q 50/04; Y02P 90/30; H04L 9/3236; H04L 9/3247; H04L 9/3268; H04L 67/1097

USPC .......................................................... 705/28
See application file for complete search history.

(56) References Cited

U.S. PATENT DOCUMENTS

| 12,306,979 | B2 * | 5/2025 | Ishii ..................... G06F 21/6218 |
| 2023/0269081 | A1 * | 8/2023 | Horowitz ............... G16C 20/70 |

FOREIGN PATENT DOCUMENTS

| CN | 115100829 A | * | 9/2022 | ............. G08B 21/18 |
| JP | 2009070257 A | * | 4/2009 | |
| JP | 5002384 B2 | * | 8/2012 | |
| WO | WO-2020246623 A1 | * | 12/2020 | ............ G06Q 30/018 |
| WO | WO-2023212347 A1 | * | 11/2023 | ................ A61J 3/06 |

* cited by examiner

Primary Examiner — Russell S Glass
(74) Attorney, Agent, or Firm — Oliff PLC

(57) ABSTRACT

When information on a chemical substance is disclosed by a node of an upstream company (S11), a controller updates product composition data (S12) and determines whether or not the disclosed information on the chemical substance is to be kept secret (S13). When the controller determines that the disclosed information on the chemical substance does not have to be kept secret (NO in S13), it adds the information on the chemical substance (a restricted substance) received in S11 to update public data (S17) and generates transaction data including the public data and transmits the transaction data to a node of a target downstream company (S18).

7 Claims, 11 Drawing Sheets

FIG.6

| PRODUCT NAME | C PRODUCT | | | |
|---|---|---|---|---|
| PRODUCT NUMBER | C001 | | | |
| CONSTITUENT PRODUCT NUMBER | CA001 | CA002 | CA003 | CA004 |
| CONTENT RATIO | X1% | X2% | X3% | X4% |
| NECESSITY FOR KEEPING SECRET | PUBLIC | PUBLIC | NON-PUBLIC | NON-PUBLIC |

↓
PUBLIC

FIG.8

| PRODUCT NAME | B PRODUCT | | | | |
|---|---|---|---|---|---|
| PRODUCT NUMBER | B001 | | | | |
| CONSTITUENT PRODUCT NUMBER | C PRODUCT:C001 | | | D PRODUCT:D001 | |
| | CA001 | CA002 | | DA001 | DA002 | DA003 |
| CONTENT RATIO | Z1% | X1% | X2% | Z2% | Y1% | Y2% | Y3% |
| NECESSITY FOR KEEPING SECRET | PUBLIC | | | NON-PUBLIC | |

FIG.9

| PRODUCT NAME | B PRODUCT | | | | | |
|---|---|---|---|---|---|---|
| PRODUCT NUMBER | B001 | | | | | |
| CONSTITUENT PRODUCT NUMBER | C PRODUCT:C001 | | | D PRODUCT:D001 | | |
| | CA001 | CA002 | CA003 | DA001 | DA002 | DA003 |
| CONTENT RATIO | Z1% | X1% | X2% | X3% | Z2% | Y1% | Y2% | Y3% |
| NECESSITY FOR KEEPING SECRET | PUBLIC | | | NON-PUBLIC | | |

INFORMATION MANAGEMENT SYSTEM AND INFORMATION MANAGEMENT METHOD

CROSS REFERENCE TO RELATED APPLICATIONS

This nonprovisional application is based on Japanese Patent Application No. 2022-122487 filed with the Japan Patent Office on Aug. 1, 2022, the entire contents of which are hereby incorporated by reference.

BACKGROUND

Field

The present disclosure relates to an information management system that manages information based on distributed ledger technology and an information management method of managing information based on distributed ledger technology.

Description of the Background Art

Japanese Patent Laying-Open No. 2009-70257 discloses an information management system that manages information on a chemical substance contained in a component traded in a supply chain including an end product manufacturer and a supplier that supplies a component to the end product manufacturer. This information management system is connected to a supplier terminal used by the supplier and another supplier terminal used by another supplier over a network. Another supplier supplies the supplier with a sub component included in a component delivered by the supplier to the end product manufacturer. The supplier requests another supplier to disclose information on a chemical substance contained in the sub component for reporting information on the chemical substance contained in the component to the end product manufacturer.

SUMMARY

In a supply chain, information on a chemical substance contained in a distributed product, in particular, a chemical substance to be restricted by laws and regulations etc., may be disclosed from an upstream company to a midstream company and from the midstream company to a downstream company. For each company, however, information on a chemical substance contained in its product is important, and there is a demand for avoidance of disclosure as much as possible. Therefore, each company may keep information on the chemical substance contained in its product secret from a downstream company, instead of voluntarily disclosing the information.

For disclosure of secret information, a plurality of types of processing are performed in each company. For example, in a midstream company, processing for requesting an upstream company to disclose secret information, processing for approving therein, disclosure of the information disclosed by the upstream company to a downstream company, or the like may be performed. Such processing is normally humanly performed by a person in charge of the processing or the like and hence much cost and many man-hours are required. Then, construction of a scheme that facilitates distribution of information in a supply chain has been desired.

The present disclosure was made to solve the problem above, and an object of the present disclosure is to provide a scheme that facilitates distribution of information in a supply chain.

(1) An information management system according to one aspect of the present disclosure manages information on a chemical substance contained in a product distributed in a supply chain based on distributed ledger technology. The information management system includes a first apparatus that belongs to a first company that manufactures a first product, the first apparatus including a first distributed ledger, a second apparatus that belongs to a second company that supplies a second product to be included in the first product to the first company, the second apparatus including a second distributed ledger, a third apparatus that belongs to a third company that supplies a third product to be included in the second product to the second company, the third apparatus including a third distributed ledger, and a management apparatus that manages the information management system, the management apparatus including a fourth distributed ledger. Each of the first distributed ledger, the second distributed ledger, the third distributed ledger, and the fourth distributed ledger includes a list showing the chemical substance managed in the information management system. Composition data of the second product including composition data of the third product disclosed by the third apparatus is stored in the second apparatus. The management apparatus adds, when the management apparatus designates a new chemical substance to be managed in the information management system, the new chemical substance to the list in the fourth distributed ledger to update the list in the fourth distributed ledger, and transmits first transaction data that proposes addition of the new chemical substance to the corresponding list to update the corresponding list to the first apparatus, the second apparatus, and the third apparatus. The first apparatus, the second apparatus, and the third apparatus update the list in the first distributed ledger, the list in the second distributed ledger, and the list in the third distributed ledger based on the first transaction data from the management apparatus, respectively. When the new chemical substance is contained in composition of the third product, the third apparatus transmits second transaction data including the composition data of the third product including information on the new chemical substance to the second apparatus. The second apparatus updates the composition data of the third product included in the composition data of the second product based on the second transaction data from the third apparatus to update the composition data of the second product, and transmits, when the second apparatus has determined to publish the composition data of the third product included in the composition data of the second product, third transaction data including the updated composition data of the second product to the first apparatus.

According to the configuration, when the second apparatus receives from the third apparatus, the second transaction data including the composition data of the third product including the information on the new chemical substance, the second apparatus updates the composition data of the third product included in the composition data of the second product based on the second transaction data from the third apparatus to update the composition data of the second product. When the second apparatus has determined to publish the composition data of the third product included in the composition data of the second product, the second apparatus transmits to the first apparatus, the third transaction data including the updated composition data of the second product. In other words, when the second apparatus has determined to publish the composition data of the third product included in the composition data of the second product at the time of disclosure of the composition data of the third product including the information on the new chemical substance to the second apparatus by the third apparatus, the second apparatus discloses the updated composition data of the second product to the first apparatus. Therefore, when decision to publish the composition data of the third product included in the composition data of the second product has been made, the updated composition data of the second product can be disclosed to the first apparatus without the need for additional processing or the like. Therefore, information can readily be distributed in the supply chain.

(2) In one embodiment, when the second apparatus has not determined to publish the composition data of the third product included in the composition data of the second product, the second apparatus performs first processing for publication of the information on the new chemical substance and transmits the third transaction data including the information on the new chemical substance to the first apparatus based on approval obtained in the first processing.

According to the configuration, when decision to publish the composition data of the third product included in the composition data of the second product has not been made, the information on the new chemical substance is disclosed based on approval obtained in the first processing. Therefore, disclosure of unnecessary information due to a system error or the like can be suppressed.

(3) In one embodiment, the second distributed ledger includes a first secret area where transaction data not shared with the first distributed ledger, the third distributed ledger, and the fourth distributed ledger is stored and a first public area where transaction data shared with at least one of the first distributed ledger, the third distributed ledger, and the fourth distributed ledger is stored. In the second apparatus, the composition data of the second product is stored in the first secret area and first public data is stored in the first public area, the first public data being data to be disclosed to the first company, of the composition data of the second product. The second apparatus adds information on the new chemical substance to the composition data of the third product included in the composition data of the second product stored in the first secret area based on the second transaction data from the third apparatus, the second transaction data including the composition data of the third product including the information on the new chemical substance, to update the composition data of the second product, and adds, when the first public data includes the composition data of the third product yet to be updated, the updated composition data of the second product to the first public data to update the first public data and transmits the third transaction data including this updated first public data to the first apparatus.

According to the configuration, when the first public data includes the composition data of the third product yet to be updated, the second apparatus adds the updated composition data of the second product to the first public data and transmits the third transaction data including the updated first public data to the first apparatus. In other words, when the first public data includes the composition data of the third product yet to be updated (the composition data of the third product yet to be updated is stored in the first public area), the second apparatus discloses the updated first public data (the updated composition data of the second product) to the first apparatus. The second apparatus can determine whether or not to disclose the updated first public data to the first company, depending on whether the composition data of the third product yet to be updated is stored in the first public area.

(4) In one embodiment, when the first public data does not include the composition data of the third product yet to be updated, the second apparatus performs the first processing, and adds the updated composition data of the second product to the first public data based on the approval obtained in the first processing to update the first public data and transmits the third transaction data including this updated first public data to the first apparatus.

According to the configuration, when the first public data does not include the composition data of the third product yet to be updated, the information on the new chemical substance is disclosed based on approval obtained in the first processing. Therefore, disclosure of unnecessary information due to a system error or the like can be suppressed.

(5) In one embodiment, the third distributed ledger includes a second secret area where transaction data not shared with the first distributed ledger, the second distributed ledger, and the fourth distributed ledger is stored and a second public area where transaction data shared with at least one of the first distributed ledger, the second distributed ledger, and the fourth distributed ledger is stored. In the third apparatus, the second transaction data including the composition data of the third product is stored in the second secret area and second public data is stored in the second public area, the second public data being data to be disclosed to the second company, of the composition data of the third product. The third apparatus performs, when the new chemical substance is added to the list in the third distributed ledger, second processing for incorporating information on the new chemical substance into the second public data, and transmits the second transaction data including the second public data including the information on the new chemical substance to the second apparatus based on approval obtained in the second processing.

According to the configuration, as a new chemical substance is added to the list in the third distributed ledger, the third apparatus discloses information on the new chemical substance based on approval obtained in the second processing. As the information on the new chemical substance is disclosed based on approval obtained in the second processing, disclosure of unnecessary information due to a system error or the like can be suppressed.

(6) In one embodiment, the chemical substance included in the list is a chemical substance designated under laws and regulations.

According to the configuration, the information management system can appropriately manage a chemical substance designated under the laws and regulations.

(7) An information management method according to another aspect of the present disclosure is an information management method for an information management system that manages information on a chemical substance contained in a product distributed in a supply chain based on distributed ledger technology. The information management system includes a first apparatus that belongs to a first company that manufactures a first product, the first apparatus including a first distributed ledger, a second apparatus that belongs to a second company that supplies a second product to be included in the first product to the first company, the second apparatus including a second distributed ledger, a third apparatus that belongs to a third company that supplies a third product to be included in the second product to the second company, the third apparatus including a third distributed ledger, and a management apparatus that manages the information management system, the management apparatus including a fourth distributed ledger. Each of the first distributed ledger, the second distributed ledger, the third distributed ledger, and the fourth distributed ledger includes a list showing the chemical substance managed in the information management system. Composition data of the second product including composition data of the third product disclosed by the third apparatus is stored in the second apparatus. The information management method includes adding, by the management apparatus, when the management apparatus designates a new chemical substance to be managed in the information management system, the new chemical substance to the list in the fourth distributed ledger to update the list in the fourth distributed ledger, and transmitting, by the management apparatus, first transaction data that proposes addition of the new chemical substance to the corresponding list to update the corresponding list to the first apparatus, the second apparatus, and the third apparatus, updating, by the first apparatus, the second apparatus, and the third apparatus, the list in the first distributed ledger, the list in the second distributed ledger, and the list in the third distributed ledger based on the first transaction data from the management apparatus, respectively, transmitting, by the third apparatus, when the new chemical substance is contained in composition of the third product, second transaction data including the composition data of the third product including information on the new chemical substance to the second apparatus, updating, by the second apparatus, the composition data of the third product included in the composition data of the second product based on the second transaction data from the third apparatus to update the composition data of the second product, and transmitting, by the second apparatus, when the second apparatus has determined to publish the composition data of the third product included in the composition data of the second product, third transaction data including the updated composition data of the second product to the first apparatus.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a diagram schematically showing exemplary product composition data on a C product of a C company.

FIG. 8 is a diagram (No. 1) schematically showing exemplary product composition data on a B product of a B company.

FIG. 9 is a diagram (No. 2) schematically showing exemplary product composition data on the B product of the B company.

DESCRIPTION OF THE PREFERRED EMBODIMENTS

Figure 1:
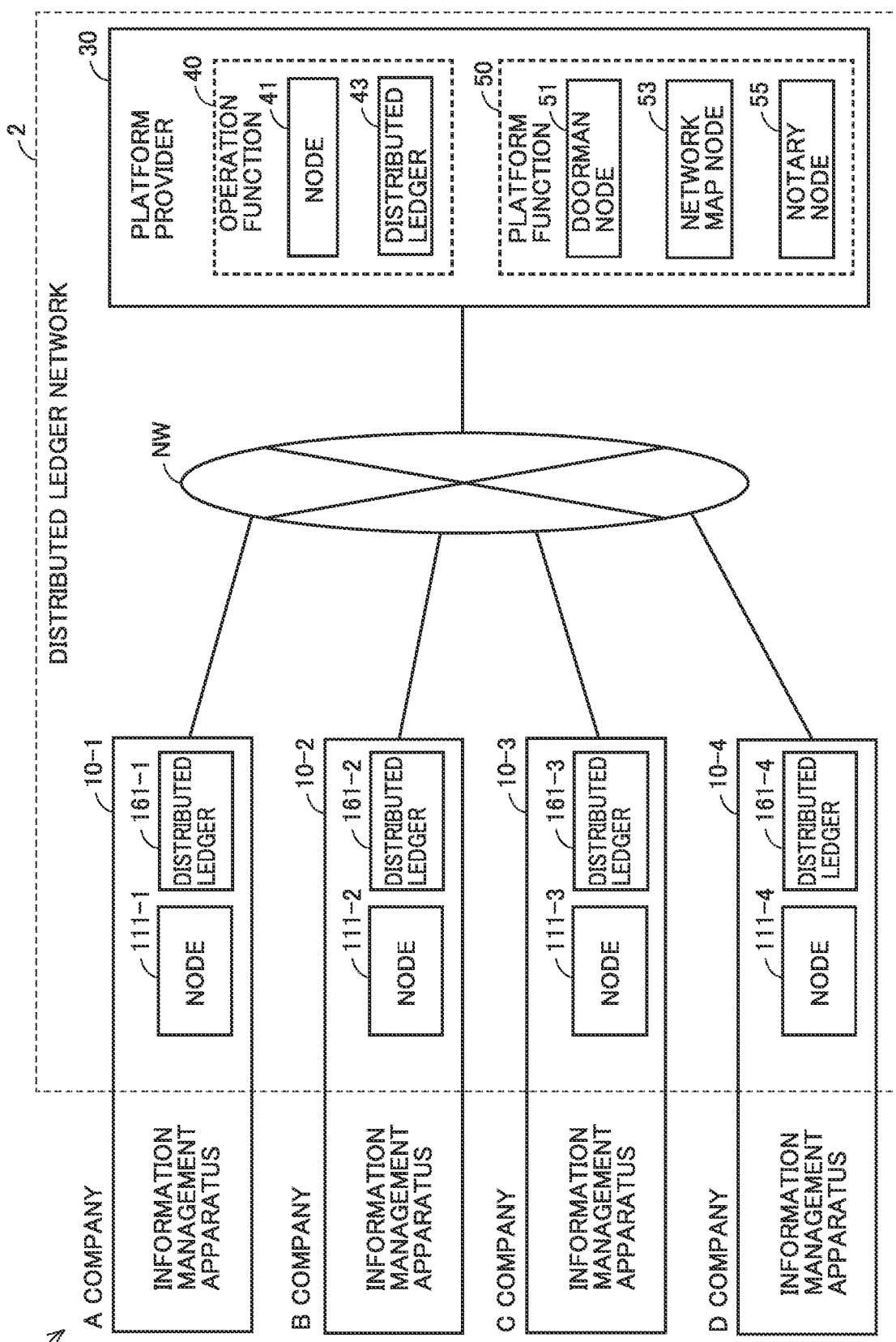
FIG. 1 is a diagram showing a schematic configuration of an information management system according to an embodiment.

An embodiment of the present disclosure will be described in detail below with reference to the drawings. The same or corresponding elements in the drawings have the same reference characters allotted and description thereof will not be repeated.

<Overall Configuration of Information Management System>

FIG. 1 is a diagram showing a schematic configuration of an information management system 1 according to the present embodiment. Information management system 1 according to the present embodiment is a system for managing, based on distributed ledger technology, information on a specific chemical substance (which is also referred to as a "subject substance" below) contained in a product (including a component and a raw material) distributed in a supply chain including a plurality of companies. In the present embodiment, a supply chain including four companies (an A company, a B company, a C company, and a D company) is assumed by way of example. In information management system 1, the subject substance is a chemical substance to be reported to a downstream company in the supply chain. The subject substance includes, for example, a chemical substance designated as a substance of very high concern (SVHC) as a highly harmful substance under the Registration, Evaluation, Authorization, and Restriction of Chemicals (REACH) regulation and/or a chemical substance designated in the global automotive declarable substance list (GADSL) which is a chemical substance list managed worldwide. The chemical substance designated as the SVHC and/or the chemical substance designated in the GADSL are/is also referred to as a "restricted substance(s)" below. The restricted substance may include a chemical substance designated under other laws and regulations. Furthermore, a company that participates in information management system 1 can also have an optional chemical substance included as the subject substance. In other words, the subject substance managed by information management system 1 may include the restricted substance and the chemical substance optionally designated by a participating company. Each company is obliged to convey (report) information on the restricted substance to a downstream company. On the other hand, each company is not obliged to convey to a downstream company, information on the chemical substance optionally designated by the participating company. Information management system 1 manages the restricted substance based on a restriction list which will be described later. In other words, when a downstream company issues a disclosure request to request an upstream company to disclose the subject substance and when the subject substance, disclosure of which has been requested, falls under a chemical substance other than the restricted substance (that is, a chemical substance not registered in the restriction list), the upstream company can reject the disclosure request.

Information management system 1 includes an information management apparatus 10-1 belonging to the A company, an information management apparatus 10-2 belonging to the B company, an information management apparatus 10-3 belonging to the C company, an information management apparatus 10-4 belonging to the D company, and a platform provider 30. In the present embodiment, the A company is an end product manufacturer and falls under what is called a "downstream company" in the supply chain. In the present embodiment, the B company is a component manufacturer and falls under what is called a "midstream company" in the supply chain. In the present embodiment, the C company and the D company are material manufacturers and fall under what is called "upstream companies" in the supply chain.

Figure 2:
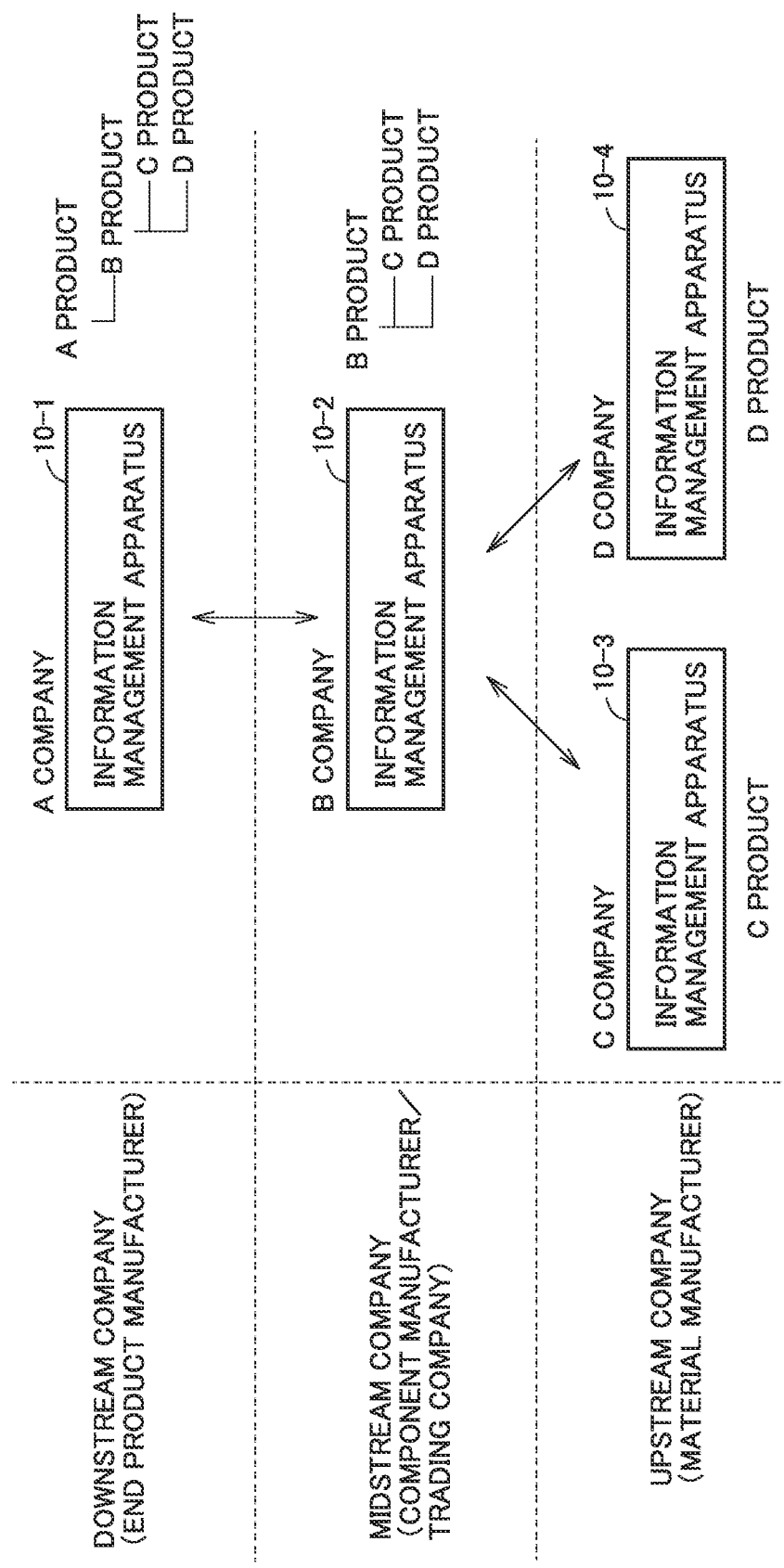
FIG. 2 is a diagram for illustrating business relation among companies in a supply chain.

FIG. 2 is a diagram for illustrating business relation among companies in the supply chain. The C company supplies a C product which is its product to the B company. The D company supplies a D product which is its product to the B company. The B company manufactures a B product which is its product from the C product purchased (supplied) from the C company and the D product purchased from the D company, and supplies the B product to the A company. The A company manufactures an A product which is its product from the product purchased from the B company and sells the A product to an end user. The A company may be, for example, an automaker.

The midstream company may include a trading company. A trading company may be interposed, for example, between the A company and the B company, between the B company and the C company, and/or between the B company and the D company.

Each company is required to manage information on a subject substance contained in a product sold by that company. Each company in the supply chain obtains disclosure from an upstream company thereof, of information on the subject substance contained in a product that it purchases therefrom, and manages the information on the subject substance contained in a product it sells. For example, the A company receives from the B company, information on the subject substance contained in the B product, and based on that information, the A company manages the information on the subject substance contained in the A product.

In information management system 1 according to the present embodiment, information is conveyed only between companies in direct business relation with each other. For example, a downstream company (the A company) and a midstream company (the B company) in supply-demand relation of products with each other are in direct business relation with each other. A midstream company (the B company) and an upstream company (the C company, the D company) in supply-demand relation of products with each other are in direct business relation with each other. On the other hand, a downstream company (the A company) and an upstream company (the C company, the D company) are not in direct business relation. In other words, information is conveyed between the downstream company (the A company) and the midstream company (the B company) and between the midstream company (the B company) and the upstream company (the C company, the D company), whereas information is not conveyed between the downstream company (the A company) and the upstream company (the C company, the D company). For example, when an E company which is a trading company is interposed between the A company and the B company, information is conveyed between the A company and the E company and between the E company and the B company, whereas information is not conveyed between the A company and the B company.

For example, when trade of the C product is started between the B company and the C company, information at least on restricted substances of subject substances contained in the C product is provided from the C company to the B company. Specifically, the C company voluntarily provides information on restricted substances among subject substances contained in the C product to the B company, or the C company provides that information to the B company in response to a request from the B company. On the other hand, information on a chemical substance other than the restricted substance among the subject substances contained in the C product is provided from the C company to the B company voluntarily or in response to a request from the B company. In other words, the C company may not provide to the B company, information on the chemical substance other than the restricted substance among the subject substances contained in the C product. This is also applicable to information provided between the A company and the B company and between the B company and the D company. When trade of the D product is started between the B company and the D company, the D company provides information at least on a restricted substance among subject substances contained in the D product to the B company. When trade of the B product is started between the A company and the B company, the B company provides information at least on the restricted substance among the subject substances contained in the B product to the A company. As each company thus receives information at least on the restricted substance among the subject substances contained in a product it purchased from an upstream company in direct business relation, each company manages information on the subject substance contained in its product including the purchased product. Information is conveyed between companies over a distributed ledger network 2 (FIG. 1) including information management apparatuses 10-1 to 10-4 and platform provider 30.

Referring again to FIG. 1, distributed ledger platform software has been introduced in each of information management apparatuses 10-1 to 10-4. The distributed ledger platform includes smart contract that allows limitation of a range where transaction data is shared to a range between concerned parties. Therefore, distributed ledgers 161-1 to 161-4 of information management apparatuses 10-1 to 10-4 hold transaction data that are different from one another. For example, CORDA® may be adopted as the distributed ledger platform. Distributed ledgers 161-1 to 161-4 may be denoted as a "distributed ledger 161-N" when they are not particularly distinguished from one another.

As the introduced distributed ledger platform software functions, controllers 110-1 to 110-4 (FIG. 5 which will be described later) included in information management apparatuses 10-1 to 10-4 function as nodes 111-1 to 111-4, respectively. Communication among nodes 111-1 to 111-4 over a network NW allows formation of distributed ledger network 2. Information management apparatuses 10-1 to 10-4 are basically similar in configuration to one another. Therefore, when information management apparatuses 10-1 to 10-4 are not particularly distinguished from one another, they may be denoted as an "information management apparatus 10-N." Nodes 111-1 to 111-4 may be denoted as a "node 111-N" when they are not particularly distinguished from one another.

Figure 3:
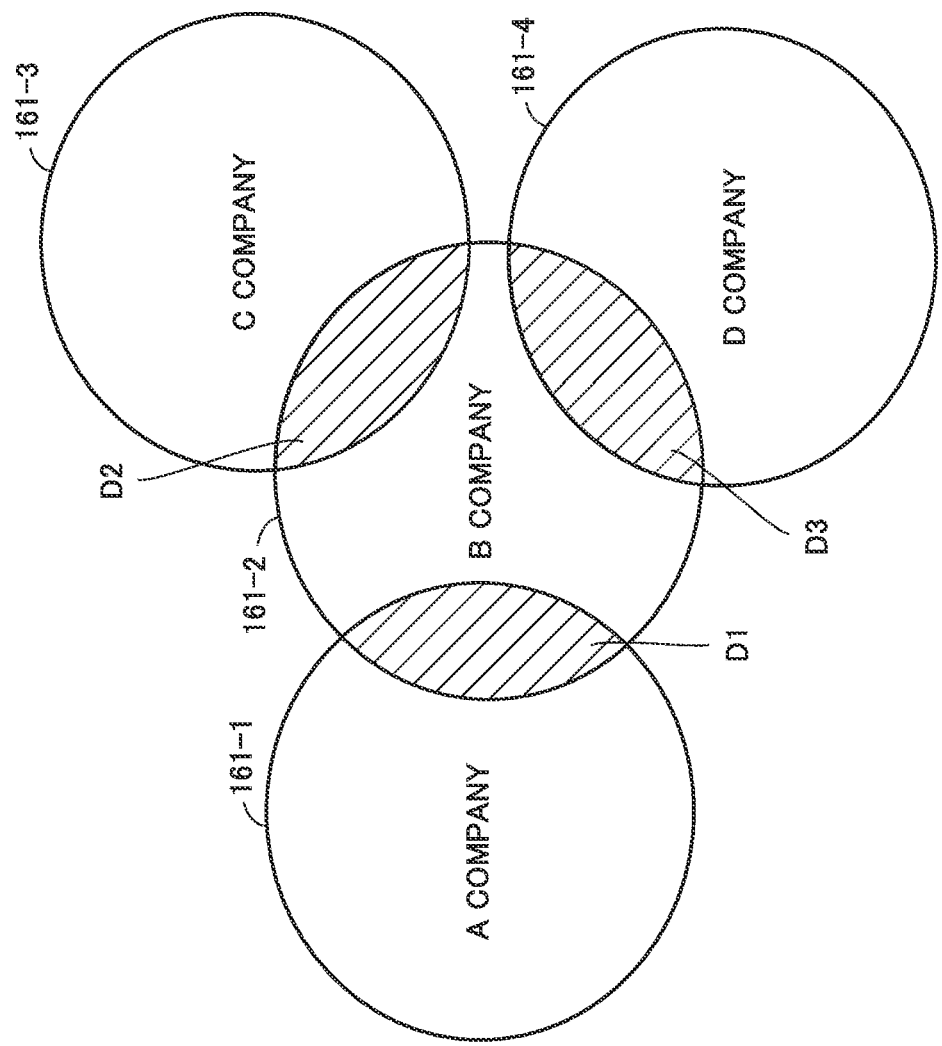
FIG. 3 is a conceptual diagram for illustrating a distributed ledger.

FIG. 3 is a conceptual diagram for illustrating distributed ledger 161-N. FIG. 3 schematically shows relation among distributed ledgers 161-1 to 161-4 stored in respective information management apparatuses 10-1 to 10-4.

Distributed ledger 161-1 and distributed ledger 161-2 share transaction data transmitted and received between information management apparatus 10-1 (node 111-1) of the A company and information management apparatus 10-2 (node 111-2) of the B company (a region D1). Region D1 includes, for example, transaction data including information on the subject substance contained in the B product, that is transmitted and received between nodes 111-1 and 111-2. Region D1 also includes, for example, transaction data for an inquiry about the subject substance contained in the B product and transaction data on an answer to the inquiry that are transmitted and received between nodes 111-1 and 111-2.

Distributed ledger 161-2 and distributed ledger 161-3 share transaction data transmitted and received between information management apparatus 10-2 (node 111-2) of the B company and information management apparatus 10-3 (node 111-3) of the C company (a region D2). Region D2 includes, for example, transaction data including information on the subject substance contained in the C product, that is transmitted and received between nodes 111-2 and 111-3. Region D2 also includes, for example, transaction data for an inquiry about the subject substance contained in the C product and transaction data on an answer to the inquiry that are transmitted and received between nodes 111-2 and 111-3.

Distributed ledger 161-2 and distributed ledger 161-4 share transaction data transmitted and received between information management apparatus 10-2 (node 111-2) of the B company and information management apparatus 10-4 (node 111-4) of the D company (a region D3). Region D3 includes, for example, transaction data including information on the subject substance contained in the D product, that is transmitted and received between nodes 111-2 and 111-4. Region D3 also includes, for example, transaction data for an inquiry about the subject substance contained in the D product and transaction data on an answer to the inquiry that are transmitted and received between nodes 111-2 and 111-4.

For example, the B company, which is the midstream company in the supply chain, may not want the A company to know information about from which company it purchases the C product and the D product included in the B product. Transaction data includes information on a sender node and a destination node. Therefore, for example, if transaction data is broadcast to all nodes that form distributed ledger network 2, the A company may know a source of the C product and the D product. In information management system 1 according to the present embodiment, as the range within which transaction data is shared is limited to the range between concerned parties, disclosure of information (a company name or the like) on a business partner to a company other than a company in direct business relation can be suppressed.

Referring again to FIG. 1, distributed ledger network 2 in information management system 1 is a consortium/private network. Platform provider 30 functions as a manager of information management system 1. Platform provider 30 performs, as its function, an operation function 40 and a platform function 50. Operation function 40 includes a node 41, a list manager 42 (FIG. 5), and a distributed ledger 43, and performs a node function to register and update a restriction list which will be described later in distributed ledger network 2. Details of operation function will be described later. Platform provider 30 corresponds to an exemplary "management apparatus" according to the present disclosure.

Platform function 50 includes a doorman node 51, a network map node 53, and a notary node 55 and functions as a platformer that manages distributed ledger network 2.

Doorman node 51 approves an application for participation from node 111-N and node 41 that desire participation into distributed ledger network 2. Doorman node 51 issues a certificate to node 111-N and node 41. Node 111-N and node 41 that participate in distributed ledger network 2 each create a pair of a secret key and a public key at the time of participation (for example, at the time of initial start-up) and transmits a request for grant of the certificate to doorman node 51. Doorman node 51 verifies a predetermined condition and issues the certificate to node 111-N and node 41 that issued the request for grant of the certificate.

Information (for example, an IP address) of node 111-N and node 41, to which the certificate was issued by doorman node 51 (that is, participation of which into distributed ledger network 2 was permitted), is stored in network map node 53. Network map node 53 functions as a domain name system (DNS) in distributed ledger network 2. Nodes 111-1 to 111-4 and node 41 that form distributed ledger network 2 recognize a destination of transaction data, for example, based on information provided from network map node 53.

Notary node 55 gives finality to transaction data. When node 111-N and node 41 generate transaction data, they send transaction data including a hash value (a transaction ID) of the transaction data and an index of output of the transaction data to notary node 55. This transaction data includes a signature of a transaction data sender node (for example, node 111-2 of the B company) and a signature of a transaction data destination node (for example, node 111-1 of the A company). Notary node 55 verifies the transaction data based on the transaction ID and the index of output, and thereafter puts the signature to the transaction data and sends back the transaction data. Notary node 55 guarantees the order of the transaction data by sequentially holding the signed transaction data. For example, notary node 55 may hold a map, the map including the transaction ID and the index of output as keys and including the transaction ID, an index of input, and peer (node) information as values. For example, notary node 55 may be configured to add the transaction data to the map and puts the signature to the transaction data when there is no matching key in the map. Notary node 55 may be configured to send back an error when there is a matching key in the map.

Node 111-N and node 41 generate transaction data. As the distributed ledger platform software functions as described above, controller 110-N (FIG. 5) included in information management apparatus 10-N functions as node 111-N. As distributed ledger platform software functions, a controller 31 (FIG. 4) included in platform provider 30 functions as node 41.

In information management system 1, platform provider 30 (operation function monitors revision of the laws and regulations etc. (that is, update of the restricted substance(s)). Specifically, platform provider 30 monitors, for example, update of the SVHC and/or update of the GADSL. When platform provider 30 senses such update, that is, when a new chemical substance is designated as an SVHC and/or when a new chemical substance is designated in the GADSL, platform provider 30 senses addition of the restricted substance. When node 41 of platform provider 30 senses addition of the restricted substance, it transmits transaction data that proposes addition of the restricted substance (update of the restriction list) to all nodes 111-1 to 111-4.

Product composition data (151-N and 164-N in FIG. 5) on a company's product is stored in information management apparatus 10-N. For each company, its product composition data is important information. In the present embodiment, in each company, the product composition data is classified into product composition data to be published to a downstream company thereof and product composition data not to be published thereto. Though details will be described later, when information on a restricted substance (subject substance) added to the restriction list as a result of update has been designated as being public, at the time of update of the restriction list, information management apparatus 10-N automatically discloses information on the subject substance to a downstream company thereof. When information on the subject substance has been designated as being non-public, at the time of update of the restriction list, information management apparatus 10-N discloses information on the subject substance to a downstream company thereof after approval processing with the use of a workflow function which will be described later.

<Hardware Configuration>

Figure 4:
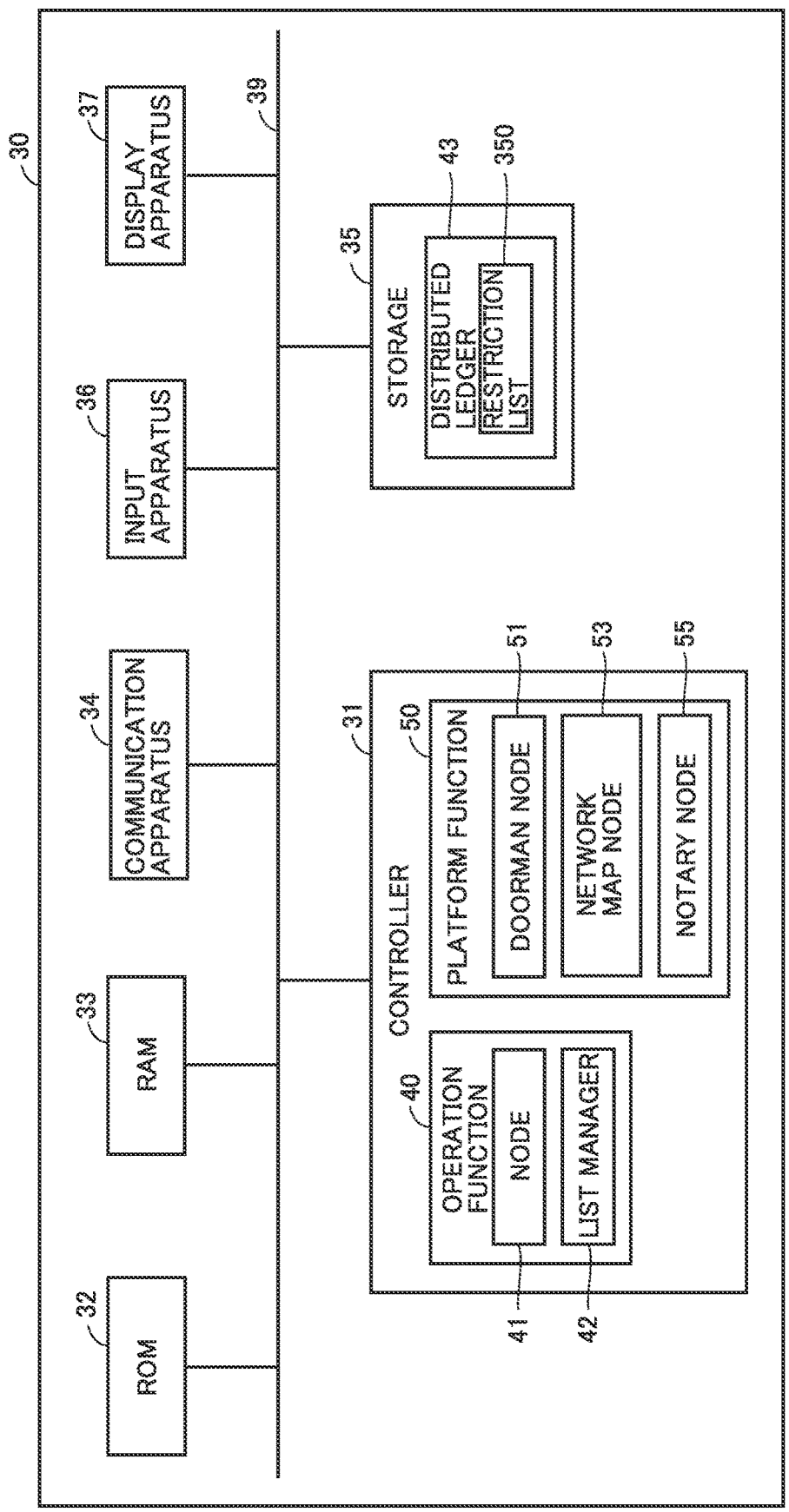
FIG. 4 is a diagram schematically showing a hardware configuration of a platform provider.

FIG. 4 is a diagram schematically showing a hardware configuration of platform provider 30. Platform provider 30 includes controller 31, a read only memory (ROM) 32, a random access memory (RAM) 33, a communication apparatus 34, a storage 35, an input apparatus 36, and a display apparatus 37. Controller 31, ROM 32, RAM 33, communication apparatus 34, storage 35, input apparatus 36, and display apparatus 37 are each connected to a bus 39.

Controller 31 is implemented, for example, by an integrated circuit including a central processing unit (CPU). Controller 31 develops various programs stored in ROM 32 on RAM 33 and executes the programs. The various programs include, for example, distributed ledger platform software. RAM 33 functions as a working memory, and various types of data necessary for execution of the various programs are temporarily stored in RAM 33. Controller 31 performs various types of processing by executing a program stored in ROM 32.

Communication apparatus 34 is configured to communicate with external equipment. The external equipment includes, for example, information management apparatus 10-N included in distributed ledger network 2. Communication apparatus 34 and the external equipment communicate with each other over the Internet. Examples of the external equipment include a server apparatus in an external group and the like that publishes a restricted substance on the Internet.

Input apparatus 36 includes an input device. The input device refers, for example, to a mouse, a keyboard, a touch panel, and/or another apparatus that can receive an operation by a user.

Display apparatus 37 includes a display. Display apparatus 37 shows on the display, various images in accordance with a control signal from controller 31. The display is, for example, a liquid crystal display, an organic electroluminescence (EL) display, or another display device.

Storage 35 includes a storage medium such as a hard disk or a flash memory. Distributed ledger 43 is stored in storage 35. Distributed ledger 43 and distributed ledger 161-N of information management apparatus 10-N are each, for example, a distributed ledger in a directed acyclic graph (DAG) structure. Transaction data included in distributed ledger 43 and distributed ledger 161-N forms a partially ordered data model. In the present embodiment, for example, one piece of transaction data forms one block.

Distributed ledger 43 includes a restriction list 350. Restriction list 350 is information indicating a restricted substance (for example, a chemical substance designated as the SVHC and/or a chemical substance designated in the GADSL). Restriction list 350 includes information on at least one restricted substance. Information on the restricted substance includes, for example, a Chemical Abstracts Service (CAS) number, a name of a substance, a date of update of restriction, and a report threshold value. The CAS number is an identification number specific to a chemical substance provided in a chemical substance registration system in CAS of the American Chemical Society. The name of the substance refers to a name of a chemical substance. The date of update of restriction refers to a date on which the chemical substance is added to restriction list 350 (date on which the chemical substance is subjected to reporting to a downstream company) or the date when restriction is imposed on the chemical substance under the laws and regulations etc. (for example, the date of designation as the SVHC). The report threshold value is a threshold value of a ratio (content ratio) of a chemical substance contained per unit amount of a product. When a content ratio is equal to or more than the report threshold value, information on the chemical substance of that product should be given to a downstream company. When the content ratio is lower than the report threshold value, information on the chemical substance does not have to be given.

A secret key generated by node 41 of controller 31 may be stored in storage 35.

Controller 31 functions as node 41 and list manager 42 by executing a program relating to operation function 40.

At the time of initial start-up, node 41 generates a secret key and a public key in conformity with a prescribed standard. The public key is sent, for example, to network map node 53 of platform function 50. Node 41 performs a function to generate transaction data. Node 41 generates an electronic signature based on the secret key and puts the electronic signature to the transaction data. The secret key is stored, for example, in storage 35 or another storage which is not shown. Node 41 performs a function to approve transaction data proposed by another node. Node 41 verifies the transaction data proposed by another node, and when it sees no problem in a result of verification, it puts the electronic signature to the transaction data and sends the transaction data back to another node.

List manager 42 manages restriction list 350. List manager 42 communicates with the outside in prescribed cycles through communication apparatus 34 and monitors revision of the laws and regulations etc. (addition of the restricted substance). Specifically, list manager 42 communicates with a server apparatus of an external group in prescribed cycles through communication apparatus 34 to monitor whether or not a new restricted substance has been designated as the SVHC or whether or not a new chemical substance has been designated in the GADSL. When list manager 42 senses addition of the new chemical substance (addition of the restricted substance) to the SVHC, for example, as a result of revision of the laws and regulations etc., it requests node 41 to add the restricted substance to restriction list 350.

When node 41 receives a request for update of restriction list 350 from list manager 42, it generates transaction data to add the newly designated restricted substance to restriction list 350 and puts a signature to the transaction data. The newly designated restricted substance is thus added to restriction list 350 and restriction list 350 is updated. Specifically, node 41 transmits the transaction data to notary node and by receiving the signed transaction data from notary node 55, node 41 commits the transaction data (finalizes the transaction). Node 41 transmits the signed transaction data to all nodes 111-1 to 111-4 that participate in distributed ledger network 2. In other words, node 41 transmits to all nodes 111-1 to 111-4 that participate in distributed ledger network 2, transaction data that proposes incorporation of the newly designated restricted substance in a restriction list 165-N (FIG. 5) of information management apparatus 10-N. As node 111-N that receives this transaction data approves the transaction data, the transaction data is added to distributed ledger 161-N of node 111-N so that restriction list 165-N of information management apparatus 10-N is updated. Specifically, node 41 transmits the transaction data sent back from node 111-N to notary node 55, and by receiving the signed transaction data from notary node 55, node 41 and node 111-N commit the transaction data. The transaction data signed by notary node 55 is transmitted, for example, from node 41 to node 111-N. Description of a process in which notary node puts the signature to transaction data in transmission and reception of transaction data between node 41 and node 111-N and between nodes 111-N may not be provided below.

Controller 31 functions as doorman node 51, network map node 53, and notary node 55 by executing a program relating to platform function 50. Since these functions are as described above, description thereof will not be repeated.

Figure 5:
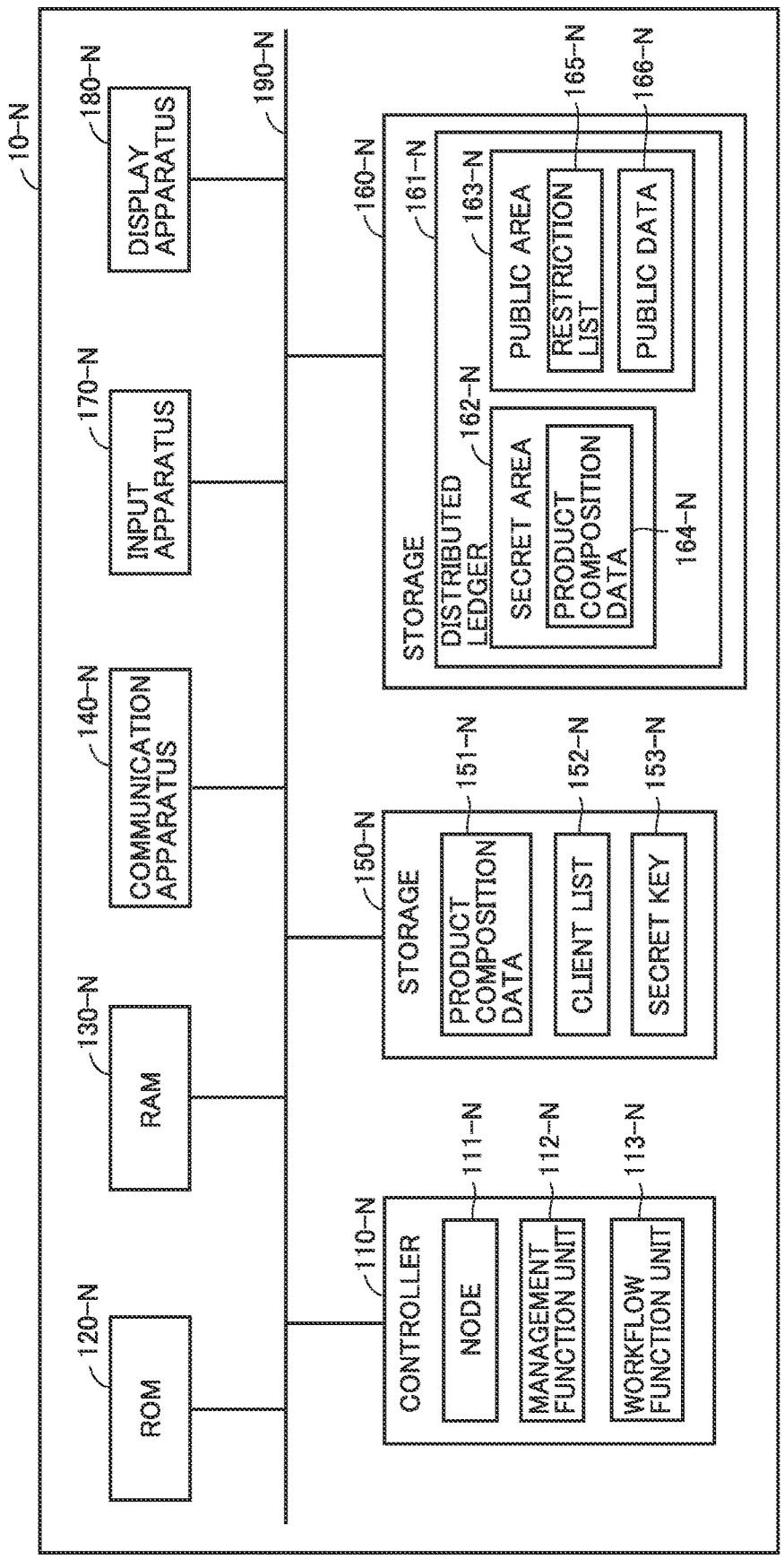
FIG. 5 is a diagram schematically showing a hardware configuration of an information management apparatus.

FIG. 5 is a diagram schematically showing a hardware configuration of information management apparatus 10-N. Information management apparatus 10-N includes a controller 110-N, a ROM 120-N, a RAM 130-N, a communication apparatus 140-N, a storage 150-N, a storage 160-N, an input apparatus 170-N, and a display apparatus 180-N. Controller 110-N, ROM 120-N, RAM 130-N, communication apparatus 140-N, storage 150-N, storage 160-N, input apparatus 170-N, and display apparatus 180-N are connected to a bus 190-N.

Controller 110-N is implemented, for example, by an integrated circuit including a CPU. Controller 110-N develops various programs stored in ROM 120-N on RAM 130-N and executes the programs. The various programs include, for example, distributed ledger platform software. RAM 130-N functions as a working memory, and various types of data necessary for execution of the various programs are temporarily stored in RAM 130-N. Controller 110-N performs various types of processing by executing a program stored in ROM 120-N.

Communication apparatus 140-N is configured to communicate with external equipment. The external equipment includes, for example, another information management apparatus included in distributed ledger network 2 and platform provider Communication apparatus 140-N and the external equipment communicate with each other, for example, over the Internet.

Input apparatus 170-N includes an input device. The input device refers, for example, to a mouse, a keyboard, a touch panel, and/or another apparatus that can receive an operation by a user.

Display apparatus 180-N includes a display. Display apparatus 180-N shows on the display, various images in accordance with a control signal from controller 110-N. The display is, for example, a liquid crystal display, an organic EL display, or another display device.

Storage 150-N includes a storage medium such as a hard disk or a flash memory. Information stored in storage 150-N is managed off-chain (on the outside of distributed ledger network 2). Product composition data 151-N of a company's product to which it belongs, a client list 152-N, and a secret key 153-N are stored in storage 150-N. For example, in the case of information management apparatus 10-1 of the A company, product composition data 151-1 includes composition data of the A product. For example, in the case of information management apparatus 10-2 of the B company, product composition data 151-2 includes composition data of the B product. For example, in the case of information management apparatus 10-3 of the C company, product composition data 151-3 includes composition data of the C product. For example, in the case of information management apparatus 10-4 of the D company, product composition data 151-4 includes composition data of the D product. Details of product composition data 151-N will be described later, together with details of product composition data 164-N which will be described later.

Client list 152-N includes information on a company to which disclosure of information is permitted. Specifically, downstream companies that do direct business transactions in the supply chain are registered in client list 152-N. For example, in the case of information management apparatus 10-1 of the A company, no company has been registered in client list 152-1. For example, in the case of information management apparatus 10-2 of the B company, the A company has been registered in client list 152-2. For example, in the case of information management apparatus 10-3 of the C company, the B company has been registered in client list 152-3. For example, in the case of information management apparatus 10-4 of the D company, the B company has been registered in client list 152-4. No answer is given to an inquiry from a company not registered in client list 152-N. Client list 152-1 does not have to be stored in storage 150-1 of information management apparatus 10-1.

Secret key 153-N and a public key (not shown) generated by controller 110-N are stored in storage 150-N. A certificate (not shown) issued by doorman node 51 of platform provider 30 is stored in storage 150-N.

Storage 160-N includes a storage medium such as a hard disk or a flash memory. Information stored in storage 160-N is managed on-chain (in the inside of distributed ledger network 2). Distributed ledger 161-N is stored in storage 160-N.

Distributed ledger 161-N includes a secret area 162-N and a public area 163-N. Secret area 162-N is an area where transaction data shared with none of other nodes is stored, that is, an area where transaction data held only by distributed ledger 161-N itself on-chain is stored. Public area 163-N is an area where transaction data shared with at least one other node is stored on-chain.

Product composition data 164-N is stored in secret area 162-N. Product composition data 164-N is the same as product composition data 151-N stored in storage 150-N. Controller 110-N has product composition data 164-N identical in content to product composition data 151-N stored also in on-chain secret area 162-N (secret area 162-N in distributed ledger 161-N). When controller 110-N updates one of product composition data 151-N and product composition data 164-N, it also updates the other in the same way. The reason why product composition data 164-N similar in contents to product composition data 151-N is stored also in secret area 162-N on-chain is because information on a chemical substance (restricted substance) newly added to restriction list 165-N can automatically be extracted from product composition data 164-N as a result of processing by node 111-N (specifically, node 111-N and a management function unit 112-N in the present embodiment) on-chain. For example, node 111-N is unable to extract information on the newly designated restricted substance from product composition data 151-N stored off-chain. In order to extract the information on the newly designated restricted substance from product composition data 151-N stored off-chain, for example, a feature for extraction should separately be added or intervention by human processing is required. As product composition data 164-N is stored on-chain, node 111-N is able to extract the information on the newly designated restricted substance from product composition data 164-N. A series of processing including update of restriction list 350 by platform provider 30, update of restriction list 165-N in response to update of restriction list 350, and extraction of information on the newly designated restricted substance from product composition data 164-N based on restriction list 165-N can thus be automated in information management apparatus 1.

Restriction list 165-N and public data 166-N are stored in public area 163-N. Restriction list 165-N is updated as platform provider 30 updates restriction list 350. When node 41 of platform provider 30 adds a restricted substance newly designated as a result of revision of the laws and regulations etc. to restriction list 350 to update restriction list 350, it transmits to node 111-N of information management apparatus 10-N, transaction data that proposes addition of the newly designated restricted substance to restriction list 165-N to update restriction list 165-N. As node 111-N approves the transaction data, the transaction data is added to distributed ledger 161-N and restriction list 165-N is updated. Specifically, the transaction data is committed through a process in which notary node 55 puts the signature to the transaction data. Public data 166-N is created by extraction of information on the restricted substance included in restriction list 165-N from product composition data 164-N. In other words, public data 166-N is information on the chemical substance included in product composition data 164-N and included in restriction list 165. Product composition data is information important for each company. The product composition data that does not have to be disclosed may be disclosed to another company, for example, due to a system error or the like. In the present embodiment, necessity for keeping secret can be determined for each prescribed unit of data included in product composition data. Data desired to be kept secret can be designated to be kept secret and data that may be disclosed can be designated not to be kept secret. When a chemical substance that has been designated to be kept secret is designated as a restricted substance, information on the chemical substance is disclosed after approval is obtained in a company with the use of the workflow function which will be described later. Therefore, more specifically, public data 166-N is information on a chemical substance (1) included in product composition data 164-N, (2) included in restriction list 165-N, and (3) designated not to be kept secret or publication of which has been approved.

FIG. 6 is a diagram schematically showing exemplary product composition data 151-3 and 164-3 on the C product of the C company. Since product composition data 151-3 is the same as product composition data 164-3 as described above, product composition data 164-3 will be described below by way of example.

Product composition data 164-3 includes item information such as a product name, a product number, a constituent product number, a content ratio, and necessity for keeping secret. The product name is the C product and the product number thereof is C001. The C product contains products (chemical substances) labeled with constituent product numbers CA001 to CA004 as its composition. In the example shown in FIG. 6, the content ratio of constituent product number CA001 occupied in the C product is X1%, the content ratio of constituent product number CA002 occupied in the C product is X2%, the content ratio of constituent product number CA003 occupied in the C product is X3%, and the content ratio of constituent product number CA004 occupied in the C product is X4%. The total of the content ratios X1% to X4% is 100%. For example, when the product labeled with constituent product number CA001 further contains products labeled with constituent product numbers CB001 and CB002, the item information associated with the constituent product number may include a first tier including constituent product numbers CA001 to CA004 and a second tier including constituent product numbers included in the product labeled with the constituent product number in the first tier for each constituent product number in the first tier. In product composition data 164-3 according to the present embodiment, the item information associated with the constituent product number includes only the first tier.

The item information expressing necessity for keeping secret indicates "public" or "non-public", which is determined for each constituent product number (each constituent product number in the first tier). In other words, the constituent product number in the first tier is defined for the prescribed unit of data described above in product composition data 164-3. "Public" means that composition data (including at least the constituent product number and the content ratio) of a chemical substance is extracted from product composition data 164-3, included in public data 166-N, and stored in public area 163-N. "Non-public" means that composition data of a chemical substance is not included in public data 166-N but remains in secret area 162-N. In the example shown in FIG. 6, constituent product numbers CA001 and CA002 are designated as being public and constituent product numbers CA003 and CA004 are designated as being non-public. Chemical substances identified by constituent product numbers CA001 and CA002 are assumed as restricted substances and chemical substances identified by constituent product numbers CA003 and CA004 are not assumed as restricted substances.

Product composition data (public data 166-3) of the C product disclosed to information management apparatus 10-2 (node 111-2) of the B company by information management apparatus 10-3 (node 111-3) of the C company includes composition data of constituent product numbers CA001 and CA002 but does not include composition data of constituent product numbers CA003 and CA004.

It is assumed that restriction list 165-3 is updated and the chemical substance identified by constituent product number CA003 is added as the restricted substance to restriction list 165-3. For disclosure to the outside, of information on the restricted substance newly added to restriction list 165-3, approval should be obtained in the C company. Information management apparatus 10-3 (information management apparatus 10-N) performs a workflow function to automate a process for obtaining approval for disclosure of information on the restricted substance. The workflow function can be applied also to disclosure of information on a chemical substance other than the restricted substance. In the present embodiment, all information management apparatuses 10-N included in information management system 1 perform the workflow function.

Figure 7:
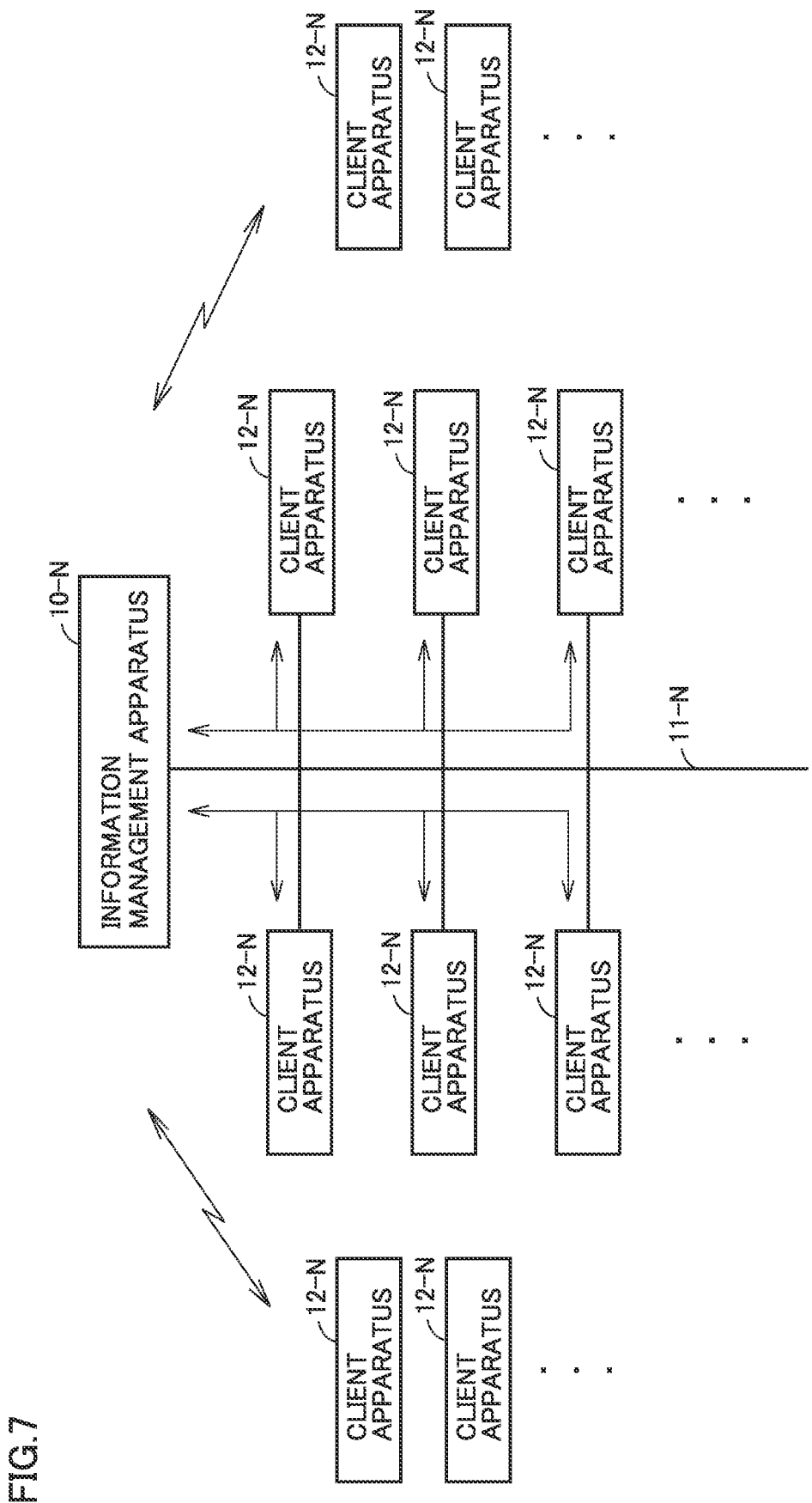
FIG. 7 is a diagram for illustrating a workflow function.

FIG. 7 is a diagram for illustrating the workflow function. Referring to FIG. 7, a plurality of client apparatuses 12-N are connected to information management apparatus 10-N to establish wireless or wired communication. Information management apparatus 10-N and client apparatus 12-N capable of establishing wired communication are each connected to a bus 11-N.

Each of the plurality of client apparatuses 12-N is a terminal apparatus belonging to a company the same as the company that manages information management apparatus 10-N or a company associated therewith. The plurality of client apparatuses 12-N belong, for example, to departments different from one another. Specifically, in an example of information management apparatus 10-3 of the C company, the plurality of client apparatuses 12-3 belong, for example, to departments different from one another in the C company.

When a new restricted substance is designated as a result of revision of laws and regulations etc., approval for disclosure of information on the new restricted substance to the outside (the downstream company) should be obtained in the company. A department having approval authority for disclosure of information on the chemical substance may be different for each chemical substance.

Information management apparatus 10-N incorporates web application software (which is also simply referred to as a "web app" below). Each of the plurality of client apparatuses 12-N uses the web app through a web browser. The workflow function in the present embodiment is performed with the use of the web app. When information management apparatus 10-N starts the workflow function, it notifies a client apparatus group (the plurality of client apparatuses 12-N) of start of the workflow.

Client apparatus 12-N of the department having the approval authority (approval department) is set in advance for each chemical substance contained in composition of a product. Each of the plurality of client apparatuses 12-N refers to the web app every prescribed cycle after it receives a notification about start of the workflow until it receives a notification about end of the workflow. Information management apparatus 10-N discloses information on the newly designated restricted substance to the plurality of client apparatuses 12-N with the use of the web app. Each of the plurality of client apparatuses 12-N determines whether or not a department to which it belongs is the approval department that approves disclosure of information on the newly designated restricted substance. Client apparatus 12-N belonging to the approval department performs approval processing when the restricted substance, disclosure of information on which is approved by the client apparatus itself, is newly designated. Thereafter, client apparatus 12-N approves disclosure to the downstream company, of information on the restricted substance contained in the product of the company to which it belongs. The approval processing may include processing for checking whether or not a content of the restricted substance in the company's product is equal to or more than a report threshold value. The report threshold value refers to a threshold value of a ratio (a content ratio) of the subject substance contained per unit amount of the product. The prescribed value is determined, for example, under the laws and regulations etc. The upstream company is obliged to disclose information on the restricted substance in its product to the downstream company when the content of the restricted substance is equal to or more than the prescribed value. The report threshold value can be the prescribed value. The approval processing may be performed automatically by a program incorporated in client apparatus 12-N or manually by a manager (employee) of a management department of client apparatus 12-N.

When information management apparatus 10-N senses approval by client apparatus 12-N in the approval department, it determines to set the item information expressing necessity for keeping secret in connection with the restricted substance, for which approval for information disclosure has been obtained, from non-public to public, and has the composition data of that restricted substance incorporated in public data 166-N. When information management apparatus 10-N senses approval by client apparatus 12-N in the approval department, it notifies the client apparatus group (the plurality of client apparatuses 12-N) of end of the workflow. The workflow function thus ends.

Node 111-N of information management apparatus 10-N generates transaction data that reports product composition data (public data 166-N) including information on the restricted substance, for which approval for information disclosure has been obtained, and transmits the transaction data to the node of the downstream company. Information on the restricted substance is thus reported to the downstream company. When a restricted substance is newly designated, only information on the restricted substance may be reported from the upstream company to the downstream company, or product composition data (public data 166-N) to which information on the restricted substance has been added may be reported from the upstream company to the downstream company.

In the example in FIG. 6, when information management apparatus 10-3 senses approval by client apparatus 12-3 in the approval department, it determines to set the item information expressing necessity for keeping secret in connection with the chemical substance identified by constituent product number CA003 from non-public to public. Node 111-3 of information management apparatus 10-3 extracts the composition data of the chemical substance (restricted substance) identified by constituent product number CA003 from product composition data 164-3 and has the composition data of the chemical substance identified by constituent product number CA003 incorporated in public data 166-3. Node 111-3 of information management apparatus 10-3 generates transaction data that reports public data 166-3 (product composition data including information on the restricted substance, for which approval for information disclosure has been obtained), and transmits the transaction data to the node of the downstream company (node 111-2 of the B company). Information on the chemical substance identified by constituent product number CA003, which is the newly added restricted substance, is thus reported to the downstream company.

FIGS. 8 and 9 are diagrams schematically showing exemplary product composition data 151-2 and 164-2 on the B product of the B company. FIG. 8 shows exemplary product composition data 151-2 and 164-2 before addition of a new restricted substance (constituent product number CA003) to restriction list 165-2. FIG. 9 shows exemplary product composition data 151-2 and 164-2 after addition of the new restricted substance (constituent product number CA003) to restriction list 165-2. Since product composition data 151-2 is the same as product composition data 164-2 as described above, product composition data 164-2 will be described below by way of example.

Initially, referring to FIG. 8, product composition data 164-2 includes item information such as a product name, a product number, a constituent product number, a content ratio, and necessity for keeping secret. The product name is the B product and the product number thereof is B001. The B product includes the C product and the D product. The first tier of the constituent product number includes the C product and the product number C001 thereof and the D product and the product number D001 thereof. The content ratio of the C product in the B product is Z1% and the content ratio of the D product in the B product is Z2%. The sum of the content ratio Z1% and the content ratio Z2% is 100%.

The second tier of the constituent product number includes the composition data of the C product disclosed by the C company and the composition data of the D product disclosed by the D company. Specifically, the second tier of the constituent product number includes constituent product numbers CA001 and CA002 incorporated in public data 166-3 by the C company and constituent product numbers DA001, DA002, and DA003 incorporated in public data 166-4 by the D company. The content ratio of constituent product number CA001 in the C product is X1% and the content ratio of constituent product number CA002 in the C product is X2%. The content ratio of constituent product number DA001 in the D product is Y1%, the content ratio of constituent product number DA002 in the D product is Y2%, and the content ratio of constituent product number DA003 in the D product is Y3%. For example, when the C company does not fully disclose composition of the C product, the sum of the content ratio X1% and the content ratio X2% is not 100%. Since the C company does not disclose information on the chemical substances identified by constituent product numbers CA003 and CA004 in the present embodiment, the sum of the content ratio X1% and the content ratio X2% is not 100%.

The item information expressing necessity for keeping secret is determined for each constituent product number in the first tier. In the example in FIG. 8, for the C product, necessity for keeping secret has been designated as being public, and for the D product, necessity for keeping secret has been designated as being non-public. Specifically, though product composition data (public data 166-2) disclosed to information management apparatus 10-1 (node 111-1) of the A company by information management apparatus 10-2 (node 111-2) of the B company includes the composition data of the C product, it does not include the composition data of the D product. In other words, though public data 166-2 includes the composition data of the C product, it does not include the composition data of the D product. Namely, the constituent product number in the first tier is defined for the prescribed unit of data described above in product composition data 164-2. For the item information expressing necessity for keeping secret, designation for each constituent product number in the second tier can also be adopted. In other words, the constituent product number in the second tier can also be defined for the prescribed unit of data.

As the restricted substance (constituent product number CA003) is added to restriction list 165-3, the composition data of constituent product number CA003 is added to public data 166-3 in information management apparatus 10-3 (node 111-3) of the C company. Transaction data that discloses public data 166-3 to which the composition data of constituent product number CA003 has been added is thus transmitted from node 111-3 to node 111-2. As node 111-2 approves the transaction data, the transaction data is added to distributed ledger 161-2 and the composition data of constituent product number CA003 is disclosed to node 111-2. Node 111-2 adds the composition data of constituent product number CA003 to update product composition data 164-2. Controller 110-2 further updates product composition data 151-2 as product composition data 164-2 is updated.

Therefore, as shown in FIG. 9, the composition data of constituent product number CA003 in connection with the C product is added to product composition data 151-2 and 164-2. Specifically, constituent product number CA003 and the content ratio X3% thereof in connection with the C product are added to product composition data 164-2. As shown also in FIG. 8, the item information expressing necessity for keeping secret in connection with the C product has been designated as being public. In other words, the composition data of the C product is included in public data 166-2. Therefore, node 111-2 extracts the composition data of constituent product number CA003 from product composition data 164-2 and has the composition data incorporated in public data 166-2. Node 111-2 transmits transaction data that discloses public data 166-2, to which the composition data of constituent product number CA003 has been added, to node 111-1 of the A company. As node 111-1 approves the transaction data, the transaction data is added to distributed ledger 161-1 and the composition data of constituent product number CA003 is disclosed to node 111-1. Node 111-1 adds the composition data of constituent product number CA003 to update product composition data 164-1. Furthermore, controller 110-1 updates product composition data 151-1 as product composition data 164-1 is updated. Thus, when the C company, which is the upstream company, discloses the composition data of the chemical substance identified by constituent product number CA003 in connection with the C product and when the item information expressing necessity for keeping secret in connection with the C product has been designated as being public in advance, node 111-2 automatically discloses the composition data of constituent product number CA003 to node 111-1 of the A company, which is the downstream company. In other words, when the item information expressing necessity for keeping secret in connection with the C product has been designated as being public before reception from node 111-3 of the C company, of transaction data that discloses public data 166-3, to which composition data of constituent product number CA003 has been added, node 111-2 automatically discloses the composition data of constituent product number CA003 to node 111-1 of the A company. "Automatic" means that node 111-2 transmits transaction data that discloses public data 166-2, to which the composition data of constituent product number CA003 has been added, to node 111-1 of the A company upon reception of the transaction data from node 111-3 of the C company. In other words, node 111-2 transmits the transaction data that discloses public data 166-2, to which the composition data of constituent product number CA003 has been added, to node 111-1 of the A company without performing approval processing.

On the assumption that the item information expressing necessity for keeping secret in connection with the C product has been designated as being non-public, when the C company, which is the upstream company, discloses the composition data on the chemical substance identified by constituent product number CA003 in connection with the C product, node 111-2 does not automatically disclose the composition data of constituent product number CA003 to node 111-1 of the A company, which is the downstream company. In this case, node 111-2 waits for approval (that is, approval processing) for publication of the composition data of the C product with the workflow function. When approval for publication of the composition data of the C product is obtained as a result of approval processing, node 111-2 discloses the composition data of the C product to node 111-1 of the A company.

Referring again to FIG. 5, controller 110-N functions as node 111-N, management function unit 112-N, and a workflow function unit 113-N by executing a program stored in ROM 120-N.

At the time of initial start-up, node 111-N generates secret key 153-N and a public key in conformity with a prescribed standard. Secret key 153-N is stored in storage 150-N. The public key is sent, for example, to network map node 53 of platform provider 30. Node 111-N performs a function to generate transaction data. Node 111-N generates an electronic signature with the use of secret key 153-N and puts the electronic signature to the transaction data. Node 111-N performs a function to approve transaction data proposed by another node. Node 111-N verifies the transaction data proposed by another node, and when it sees no problem in a result of verification, it puts the electronic signature to the transaction data and sends the transaction data back to another node.

When node 111-N receives from node 41 of platform provider 30, the transaction data that proposes incorporation of the restricted substance newly designated as a result of revision of the laws and regulations etc. into restriction list 165-N, it verifies the transaction data and thereafter approves the transaction data. Then, node 111-N has the transaction data stored in distributed ledger 161-N. The newly designated restricted substance is thus added to restriction list 165-N and restriction list 165-N is updated.

When restriction list 165-N is updated, node 111-N performs processing for checking (checking processing) whether or not information on the restricted substance added to restriction list 165-N as a result of update has to be disclosed to the downstream company. Specifically, node 111-N checks the restricted substance added to restriction list 165-N against product composition data 164-N and checks whether or not the content ratio of the added restricted substance in a product of a company to which it belongs is equal to or more than the report threshold value. When the content ratio of the restricted substance in product composition data 164-N is equal to or more than the report threshold value, node 111-N determines that the information on the restricted substance has to be disclosed to the downstream company. In other words, node 111-N confirms that update of restriction list 165-N affects itself. When the content ratio of the restricted substance in product composition data 164-N is less than the report threshold value, node 111-N determines that the information on the restricted substance does not have to be disclosed to the downstream company. In other words, node 111-N confirms that update of restriction list 165-N does not affect itself. When node 111-N confirms that update of restriction list 165-N affects itself, node 111-N notifies management function unit 112-N of that fact. Management function unit 112-N can also perform the function to perform checking processing. In this case, for example, when management function unit 112-N senses update of restriction list 165-N by node 111-N, it performs checking processing with the use of product composition data 151-N.

When management function unit 112-N is notified of the fact that update of restriction list 165-N affects itself, it performs processing (reading processing) for reading information (client information) on the downstream company from storage 150-N. Specifically, management function unit 112-N reads the client information by referring to client list 152-N stored in storage 150-N. Management function unit 112-N gives to workflow function unit 113-N, information on the restricted substance to be reported to the downstream company. The function to perform reading processing by management function unit 112-N can also be performed by node 111-N. In this case, for example, information similar to client list 152-N is stored also in secret area 162-N in distributed ledger 161-N stored in storage 160-N. In other words, information similar to client list 152-N is also stored on-chain. Node 111-N can thus read client information from distributed ledger 161-N.

Workflow function unit 113-N notifies the client apparatus group (FIG. 7) of start and end of the workflow. When workflow function unit 113-N obtains with its workflow function, approval for disclosure of information on the restricted substance added to restriction list 165-N from client apparatus 12-N in the approval department, it notifies management function unit 112-N of that fact.

When management function unit 112-N receives an approval notification from workflow function unit 113-N, it requests node 111-N to update public data 166-N.

When node 111-N receives the request for update of public data 166-N, it adds information on the restricted substance, for which approval for information disclosure has been obtained, to update public data 166-N. Then, node 111-N generates transaction data including public data 166-N and transmits the transaction data to the node of a target downstream company. When the node of the downstream company approves the transaction data, public data 166-N is disclosed to the downstream company. In other words, information on the added restricted substance is reported to the downstream company. Information on the chemical substance (the restricted substance in the present embodiment) is disclosed to the downstream company by the upstream company. Node 111-N may generate transaction data including information on the restricted substance for which approval for information disclosure has been obtained, and transmit the transaction data to the node of the target downstream company.

Each element of controller 110-N functions, for example, as below when the information on the chemical substance is disclosed by the node of an upstream company thereof.

When node 111-N receives transaction data including public data from the node of the upstream company, it verifies and approves the transaction data. Information on the chemical substance newly disclosed by the node of the upstream company is thus added to product composition data 164-N and product composition data 164-N is updated. Management function unit 112-N senses update of product composition data 164-N. Management function unit 112-N updates product composition data 151-N as product composition data 164-N is updated.

Node 111-N performs processing for determining (determination processing) whether or not the disclosed information on the chemical substance is to be kept secret. When the composition data of the product containing the disclosed chemical substance is included in public data 166-N (in other words, the item information expressing necessity for keeping secret in connection with the product containing the disclosed chemical substance has been designated as being public in advance in product composition data 164-N), node 111-N determines that the disclosed chemical substance does not have to be kept secret. When the composition data of the product containing the disclosed chemical substance is not included in public data 166-N (in other words, the item information expressing necessity for keeping secret in connection with the product containing the disclosed chemical substance has been designated as being non-public in advance in product composition data 164-N), node 111-N determines that the disclosed chemical substance is to be kept secret.

Description will be given with reference to the example shown in FIG. 9. When node 111-3 of the C company, which is the upstream company, discloses information on the chemical substance identified by constituent product number CA003, node 111-2 of the B company determines that the disclosed chemical substance does not have to be kept secret because the item information expressing necessity for keeping secret in connection with the C product containing the chemical substance identified by constituent product number CA003 has been designated as being public in advance (the composition data of the C product is included in public data 166-2).

When node 111-N determines that the disclosed chemical substance does not have to be kept secret, it has information on the chemical substance incorporated in public data 166-N. Node 111-N then transmits transaction data including public data 166-N to the node of a downstream company thereof. In these ways, node 111-N determines whether or not the chemical substance is to be kept secret when information on the chemical substance is disclosed by an upstream company thereof, and when the chemical substance does not have to be kept secret, it discloses the information on the chemical substance to the downstream company. A series of processing from disclosure of the information on the chemical substance by the upstream company until disclosure of the information on the chemical substance to the downstream company can be automated.

When node 111-N determines that the disclosed chemical substance is to be kept secret, it checks whether or not the disclosed chemical substance falls under the restricted substance based on restriction list 165-N. Unless the disclosed chemical substance falls under the restricted substance, the node is not obliged to disclose the chemical substance to the downstream company, whereas when the disclosed chemical substance falls under the restricted substance, the node has to disclose the chemical substance to the downstream company. When node 111-N determines that the disclosed chemical substance falls under the restricted substance, it notifies management function unit 112-N of that fact (the upstream company has disclosed the restricted substance).

When management function unit 112-N is notified of disclosure of the restricted substance by the upstream company, it performs the reading processing described above, that is, processing for reading information (client information) on the downstream company from storage 150-N. Management function unit 112-N gives workflow function unit 113-N information (the chemical substance disclosed by the upstream company) on the restricted substance to be reported to the downstream company.

Workflow function unit 113-N notifies the client apparatus group (FIG. 7) of start and end of the workflow. When workflow function unit 113-N obtains approval for disclosure of information on the restricted substance added to restriction list 165-N from client apparatus 12-N in the approval department with the workflow function, it notifies management function unit 112-N of that fact.

When management function unit 112-N receives approval notification from workflow function unit 113-N, it requests node 111-N to update public data 166-N.

When node 111-N receives the request for update of public data 166-N, it adds the information on the restricted substance, for which approval for information disclosure has been obtained, to update public data 166-N. Node 111-N then generates transaction data including updated public data 166-N and transmits the transaction data to the node of the target downstream company. As the node of the downstream company approves the transaction data, public data 166-N is disclosed to the downstream company. In other words, information on the chemical substance (restricted substance) disclosed by the upstream company is reported to the downstream company. Node 111-N may generate transaction data including information on the restricted substance, for which approval for information disclosure has been obtained, and transmit the transaction data to the node of the target downstream company.

Management function unit 112-N can also perform the function to perform the determination processing (processing for determining whether or not information on the chemical substance disclosed by the upstream company is to be kept secret) described above. In this case, for example, information the same as restriction list 165-N is stored also in storage 150-N. In other words, information the same as restriction list 165-N is also stored off-chain. Management function unit 112-N can thus perform determination processing with the use of the restriction list stored in storage 150-N.

<Flowchart>

Figure 10:
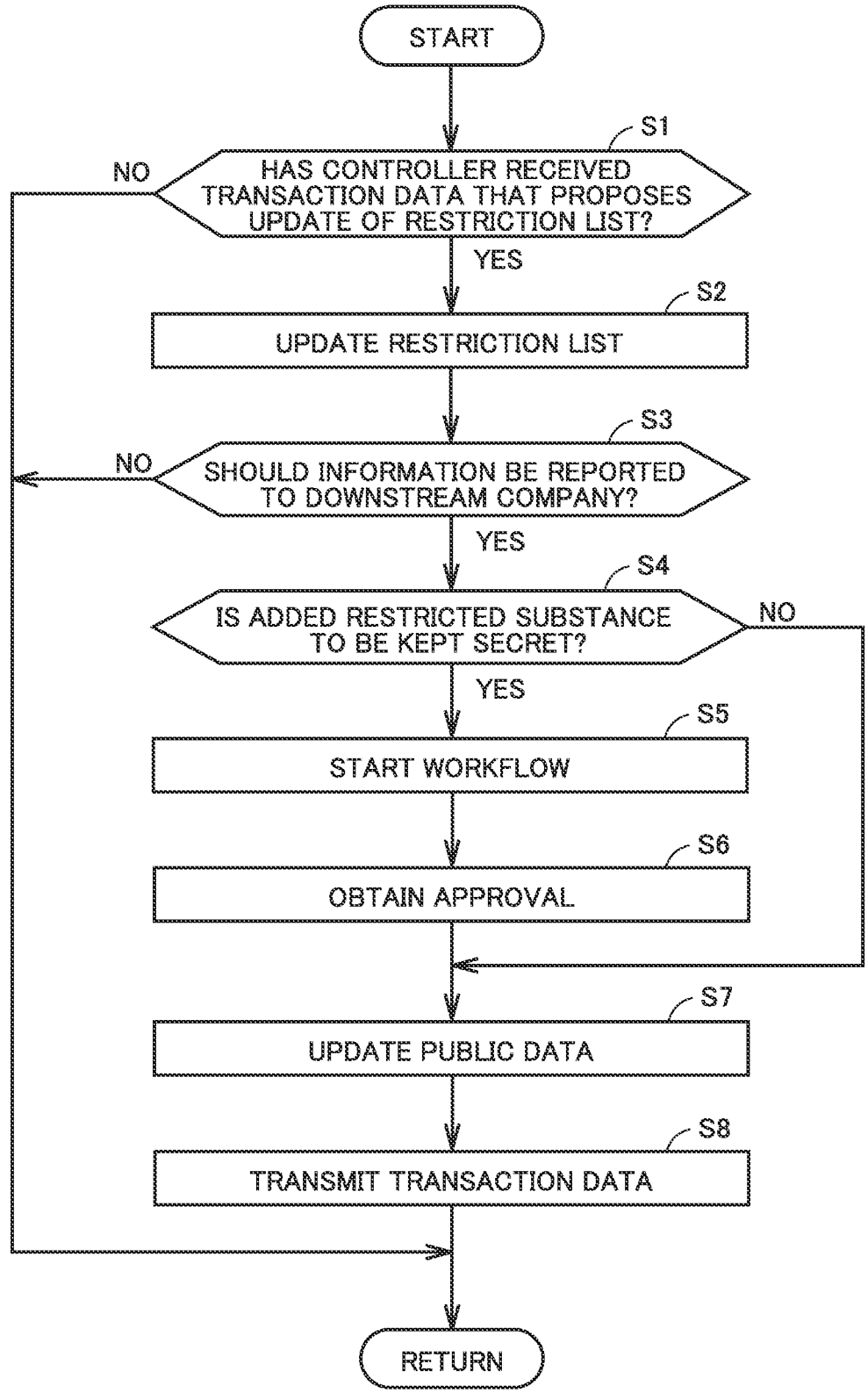
FIG. 10 is a flowchart showing a procedure in processing performed by a controller of the information management apparatus at the time of update of a restriction list.

FIG. 10 is a flowchart showing a procedure in processing performed by controller 110-N of information management apparatus 10-N at the time of update of the restriction list. Processing in the flowchart shown in FIG. 10 is invoked from a main routine after information management apparatus 10-N is started up, and repeatedly performed every prescribed cycle. Though an example where each step (the step being abbreviated as "S" below) in the flowchart shown in FIG. 10 and FIG. 11 which will be described later is performed by software processing by controller 110-N of information management apparatus 10-N is described, a part or the entirety thereof may be performed by hardware (electronic circuitry) made in controller 110-N.

In S1, controller 110-N (node 111-N) determines whether or not it has received transaction data that proposes incorporation of a new restricted substance in restriction list 165-N from node 41 of platform provider 30. When controller 110-N (node 111-N) determines that it has received the transaction data (YES in S1), the process proceeds to S2. When controller 110-N (node 111-N) determines that it has not received the transaction data (NO in S1), the process returns.

In S2, after controller 110-N (node 111-N) verifies the transaction data received in S1, it approves the transaction data. Controller 110-N (node 111-N) has the transaction data stored in distributed ledger 161-N. Thus, the newly designated restricted substance is added to restriction list 165-N and restriction list 165-N is updated.

In S3, controller 110-N (node 111-N) performs checking processing and determines whether or not information on the added restricted substance should be reported to the downstream company. Specifically, controller 110-N (node 111-N) checks the restricted substance added to restriction list 165-N against product composition data 164-N and checks whether or not the added restricted substance is contained in the product (company's product) supplied by the company to the downstream company. When the company's product contains the added restricted substance, controller 110-N (node 111-N) also checks whether or not the content ratio thereof is equal to or more than the report threshold value. When product composition data 164-N includes the restricted substance and the content ratio of the restricted substance is equal to or more than the report threshold value, controller 110-N (node 111-N) determines that the information on the restricted substance should be disclosed to the downstream company (YES in S3) and the process proceeds to S4. When product composition data 164-N does not include the restricted substance or when product composition data 164-N includes the restricted substance but the content ratio of the restricted substance is less than the report threshold value, controller 110-N (node 111-N) determines that the information on the restricted substance does not have to be disclosed to the downstream company (NO in S3), and the process returns.

In S4, controller 110-N (node 111-N) determines whether or not information on the added restricted substance is to be kept secret in the company. Specifically, controller 110-N (node 111-N) determines whether or not the information on the added restricted substance is to be kept secret based on whether or not the added restricted substance has already been included in public data 166-N. When controller 110-N (node 111-N) determines that the added restricted substance has not yet been included in public data 166-N (YES in S4), it determines that the information on the added restricted substance is to be kept secret and the process proceeds to S5. When controller 110-N (node 111-N) determines that the added restricted substance has already been included in public data 166-N (NO in S4), it determines that the information on the added restricted substance does not have to be kept secret, and the process proceeds to S7 with processing in S5 and S6 being skipped.

In S5, controller 110-N (management function unit 112-N) reads information (client information) on the downstream company from storage 150-N. Controller 110-N (workflow function unit 113-N) notifies the client apparatus group of start of the workflow in order to obtain approval for disclosure of information on the restricted substance to be reported to the downstream company.

In S6, controller 110-N (workflow function unit 113-N) obtains approval for disclosure of information on the restricted substance added to restriction list 165-N from client apparatus 12-N in the approval department. Controller 110-N (workflow function unit 113-N) notifies the client apparatus group of end of the workflow.

In S7, controller 110-N (node 111-N) adds the information on the restricted substance added to restriction list 165-N to update public data 166-N.

In S8, controller 110-N (node 111-N) generates transaction data including public data 166-N and transmits the transaction data to the node of the target downstream company. As the node of the downstream company approves the transaction data, public data 166-N is disclosed to the downstream company. In other words, information on the added restricted substance is reported to the downstream company.

Figure 11:
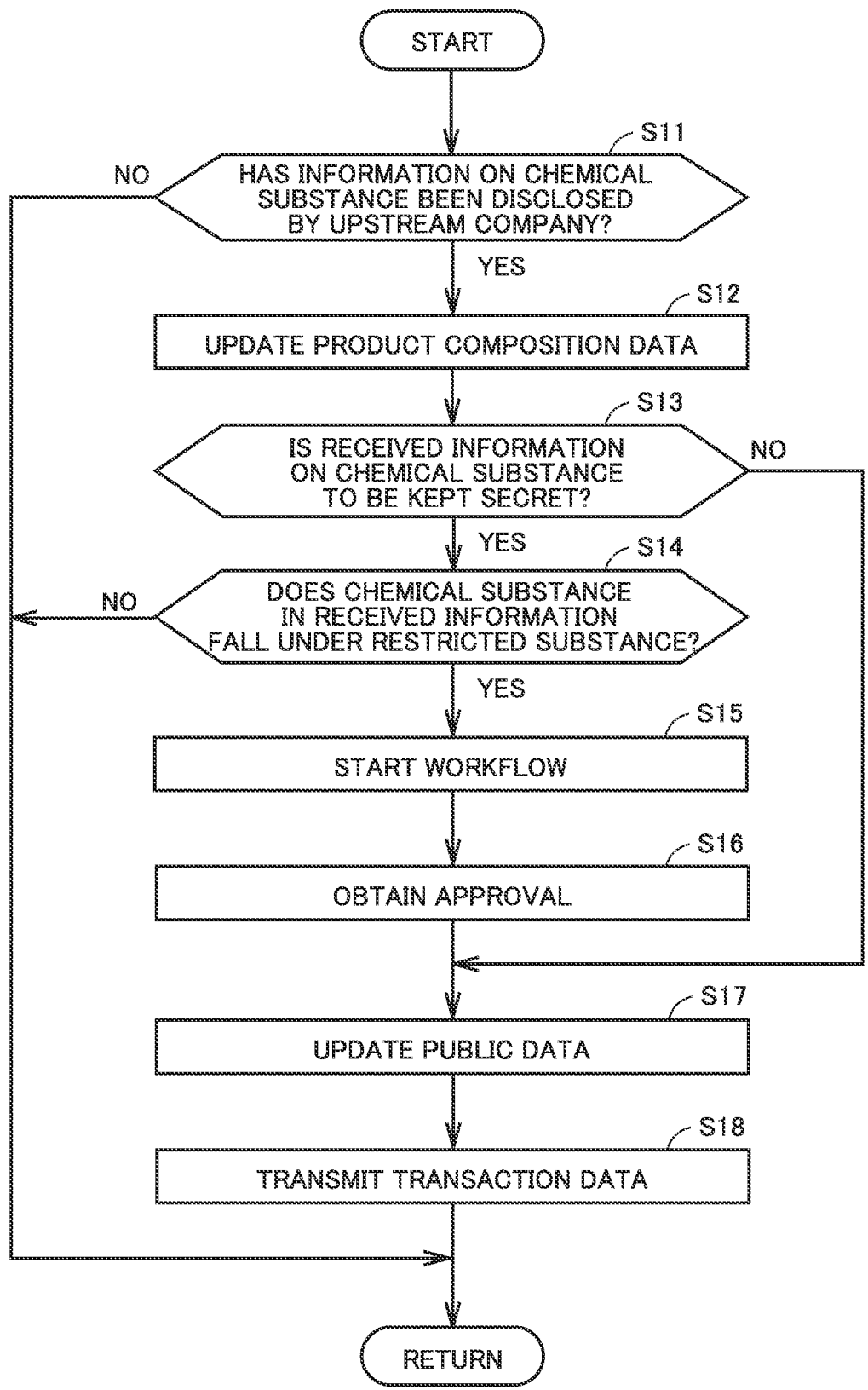
FIG. 11 is a flowchart showing a procedure in processing performed by the controller of the information management apparatus at the time of reception of information on a chemical substance from an upstream company.

FIG. 11 is a flowchart showing a procedure in processing performed by controller 110-N of information management apparatus 10-N at the time of reception of information on the chemical substance from the upstream company. Processing in the flowchart shown in FIG. 11 is invoked from the main routine after information management apparatus 10-N is started up, and repeatedly performed every prescribed cycle.

In S11, controller 110-N (node 111-N) determines whether or not information on the chemical substance has been disclosed by the node of the upstream company. In other words, controller 110-N (node 111-N) determines whether or not it has received transaction data including the public data from the node of the upstream company. When the information on the chemical substance has been disclosed to controller 110-N (node 111-N) by the node of the upstream company (YES in S11), the process proceeds to S12. When the information on the chemical substance has not been disclosed to controller 110-N (node 111-N) by the node of the upstream company (NO in S11), the process returns.

In S12, controller 110-N (node 111-N) approves the transaction data received from the node of the upstream company and has the transaction data stored in distributed ledger 161-N. Product composition data 164-N is thus updated. Controller 110-N (management function unit 112-N) updates product composition data 151-N as product composition data 164-N is updated.

In S13, controller 110-N (node 111-N) determines whether or not the received (disclosed) information on the chemical substance is to be kept secret in a company to which it belongs. As shown in FIGS. 8 and 9, it is assumed that the constituent product number in the first tier is defined for the prescribed unit of data. Specifically, controller 110-N (node 111-N) determines whether or not composition data of the product containing the disclosed chemical substance is included in public data 166-N (the item information expressing necessity for keeping secret in connection with the product containing the disclosed chemical substance is designated as being public in advance in product composition data 164-N). When controller 110-N (node 111-N) determines that the composition data of the product containing the disclosed chemical substance is not included in public data 166-N (YES in S13), it determines that the information on the disclosed chemical substance is to be kept secret and the process proceeds to S14. When controller 110-N (node 111-N) determines that the composition data of the product containing the disclosed chemical substance is included in public data 166-N (NO in S13), it determines that the information on the disclosed chemical substance does not have to be kept secret and the process proceeds to S17 with processing (approval processing) in S14 to S16 being skipped.

In S14, controller 110-N (node 111-N) determines whether or not the chemical substance in the received information falls under the restricted substance based on restriction list 165-N. When controller 110-N (node 111-N) determines that the chemical substance in the received information falls under the restricted substance (YES in S14), the process proceeds to S15 in order to disclose the information on the chemical substance to the node of the downstream company. When controller 110-N (node 111-N) determines that the chemical substance does not fall under the restricted substance (NO in S14), the process returns without the information on the chemical substance being disclosed to the node of the downstream company.

In S15, controller 110-N (management function unit 112-N) reads information (client information) on the downstream company from storage 150-N. Controller 110-N (workflow function unit 113-N) notifies the client apparatus group of start of the workflow in order to obtain approval for disclosure of the information on the restricted substance (the received information on the chemical substance) to the downstream company.

In S16, controller 110-N (workflow function unit 113-N) obtains approval for disclosure of the received information on the chemical substance from client apparatus 12-N in the approval department. Controller 110-N (workflow function unit 113-N) notifies the client apparatus group of end of the workflow.

In S17, controller 110-N (node 111-N) adds the information on the chemical substance (restricted substance) received in S11 to update public data 166-N.

In S18, controller 110-N (node 111-N) generates transaction data including public data 166-N and transmits the transaction data to the node of the target downstream company. As the node of the downstream company approves the transaction data, public data 166-N is disclosed to the downstream company. In other words, the received information on the restricted substance is reported to the downstream company.

As set forth above, in information management system 1 according to the present embodiment, as platform provider 30 updates restriction list 350, in each node 111-N, restriction list 165-N is updated as restriction list 350 is updated. Then, as restriction list 165-N is updated, information on the restricted substance is disclosed to a downstream company by an upstream company.

When the information on the chemical substance is disclosed by the upstream company and when the chemical substance does not to have to be kept secret and falls under the restricted substance, node 111-N discloses the composition data of a product of a company to which it belongs, the composition data including information on the chemical substance disclosed by the upstream company, to the downstream company. In other words, a series of processing including update of restriction list 350 by platform provider 30, update of restriction list 165-N in accordance with restriction list 350, and extraction of information on the newly designated restricted substance from product composition data 164-N based on restriction list 165-N can be automated. Therefore, information can readily be distributed in the supply chain.

When the chemical substance disclosed by the upstream company is to be kept secret, node 111-N discloses the composition data of the company's product including information on the chemical substance disclosed by the upstream company to the downstream company after it performs approval processing. For example, when the chemical substance disclosed by the upstream company falls under the restricted substance, the composition data of the company's product including information on the chemical substance may automatically be disclosed to the downstream company. Product composition data that does not have to be disclosed, however, may be disclosed to another company due to a system error or the like. When the chemical substance disclosed by the upstream company is to be kept secret as above, composition data of the company's product including information on the chemical substance is disclosed to the downstream company after the approval processing, so that unnecessary disclosure of the composition data of the company's product can be suppressed.

Furthermore, in information management system 1 according to the present embodiment, since the restriction list (restriction lists 350 and 165-N) and public data 166-N are managed based on the distributed ledger technology, tamper resistance thereof can be enhanced.

[Modification]

In the embodiment, whether or not to disclose information on a disclosed chemical substance to a downstream company is determined based on whether or not composition data of a product containing the chemical substance disclosed by an upstream company is included in public data 166-N. Whether or not to disclose the information on the disclosed chemical substance to the downstream company, however, may be determined, for example, by setting a flag indicating necessity for keeping secret for each prescribed unit of data in product composition data 151-N and 164-N and making determination based on the flag.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An information management system that manages information on a chemical substance contained in a product distributed in a supply chain based on distributed ledger technology, the information management system comprising:
a first apparatus that belongs to a first company that manufactures a first product, the first apparatus including a first distributed ledger;
a second apparatus that belongs to a second company that supplies a second product to be included in the first product to the first company, the second apparatus including a second distributed ledger;
a third apparatus that belongs to a third company that supplies a third product to be included in the second product to the second company, the third apparatus including a third distributed ledger; and
a management apparatus that manages the information management system, the management apparatus including a fourth distributed ledger, wherein
each of the first distributed ledger, the second distributed ledger, the third distributed ledger, and the fourth distributed ledger includes a list showing the chemical substance managed in the information management system,
composition data of the second product including composition data of the third product disclosed by the third apparatus is stored in the second apparatus,
the management apparatus
adds, when the management apparatus designates a new chemical substance to be managed in the information management system, the new chemical substance to the list in the fourth distributed ledger to update the list in the fourth distributed ledger, and
transmits first transaction data that proposes addition of the new chemical substance to the corresponding list to update the corresponding list to the first apparatus, the second apparatus, and the third apparatus,
the first apparatus, the second apparatus, and the third apparatus update the list in the first distributed ledger, the list in the second distributed ledger, and the list in the third distributed ledger based on the first transaction data from the management apparatus, respectively,
when the new chemical substance is contained in composition of the third product, the third apparatus transmits second transaction data including the composition data of the third product including information on the new chemical substance to the second apparatus, and
the second apparatus
updates the composition data of the third product included in the composition data of the second product based on the second transaction data from the third apparatus to update the composition data of the second product, and
transmits, when the second apparatus has determined to publish the composition data of the third product included in the composition data of the second product, third transaction data including the updated composition data of the second product to the first apparatus.

2. The information management system according to claim 1, wherein
when the second apparatus has not determined to publish the composition data of the third product included in the composition data of the second product,
the second apparatus
performs first processing for publication of the information on the new chemical substance, and
transmits the third transaction data including the information on the new chemical substance to the first apparatus based on approval obtained in the first processing.

3. The information management system according to claim 2, wherein
the second distributed ledger includes
a first secret area where transaction data not shared with the first distributed ledger, the third distributed ledger, and the fourth distributed ledger is stored, and
a first public area where transaction data shared with at least one of the first distributed ledger, the third distributed ledger, and the fourth distributed ledger is stored,
in the second apparatus, the composition data of the second product is stored in the first secret area and first public data is stored in the first public area, the first public data being data to be disclosed to the first company, of the composition data of the second product, and
the second apparatus
adds information on the new chemical substance to the composition data of the third product included in the composition data of the second product stored in the first secret area based on the second transaction data from the third apparatus, the second transaction data including the composition data of the third product including the information on the new chemical substance, to update the composition data of the second product, and
adds, when the first public data includes the composition data of the third product yet to be updated, the updated composition data of the second product to the first public data to update the first public data and transmits the third transaction data including this updated first public data to the first apparatus.

4. The information management system according to claim 3, wherein
when the first public data does not include the composition data of the third product yet to be updated, the second apparatus
performs the first processing, and
adds the updated composition data of the second product to the first public data based on the approval obtained in the first processing to update the first public data and transmits the third transaction data including this updated first public data to the first apparatus.

5. The information management system according to claim 4, wherein
the third distributed ledger includes a second secret area where transaction data not shared with the first distributed ledger, the second distributed ledger, and the fourth distributed ledger is stored and a second public area where transaction data shared with at least one of the first distributed ledger, the second distributed ledger, and the fourth distributed ledger is stored,
in the third apparatus, the second transaction data including the composition data of the third product is stored in the second secret area and second public data is stored in the second public area, the second public data being data to be disclosed to the second company, of the composition data of the third product, and
the third apparatus
performs, when the new chemical substance is added to the list in the third distributed ledger, second processing for incorporating information on the new chemical substance into the second public data, and
transmits the second transaction data including the second public data including the information on the new chemical substance to the second apparatus based on approval obtained in the second processing.

6. The information management system according to claim 1, wherein
the chemical substance included in the list is a chemical substance designated under laws and regulations.

7. An information management method for an information management system that manages information on a chemical substance contained in a product distributed in a supply chain based on distributed ledger technology,
the information management system including
a first apparatus that belongs to a first company that manufactures a first product, the first apparatus including a first distributed ledger,
a second apparatus that belongs to a second company that supplies a second product to be included in the first product to the first company, the second apparatus including a second distributed ledger,
a third apparatus that belongs to a third company that supplies a third product to be included in the second product to the second company, the third apparatus including a third distributed ledger, and
a management apparatus that manages the information management system, the management apparatus including a fourth distributed ledger,
each of the first distributed ledger, the second distributed ledger, the third distributed ledger, and the fourth distributed ledger including a list showing the chemical substance managed in the information management system,
composition data of the second product including composition data of the third product disclosed by the third apparatus being stored in the second apparatus,
the information management method comprising:
adding, by the management apparatus, when the management apparatus designates a new chemical substance to be managed in the information management system, the new chemical substance to the list in the fourth distributed ledger to update the list in the fourth distributed ledger, and transmitting, by the management apparatus, first transaction data that proposes addition of the new chemical substance to the corresponding list to update the corresponding list to the first apparatus, the second apparatus, and the third apparatus;
updating, by the first apparatus, the second apparatus, and the third apparatus, the list in the first distributed ledger, the list in the second distributed ledger, and the list in the third distributed ledger based on the first transaction data from the management apparatus, respectively;
transmitting, by the third apparatus, when the new chemical substance is contained in composition of the third product, second transaction data including the composition data of the third product including information on the new chemical substance to the second apparatus;

updating, by the second apparatus, the composition data of the third product included in the composition data of the second product based on the second transaction data from the third apparatus to update the composition data of the second product; and transmitting, by the second apparatus, when the second apparatus has determined to publish the composition data of the third product included in the composition data of the second product, third transaction data including the updated composition data of the second product to the first apparatus.

* * * * *